(12) United States Patent
Wang et al.

(10) Patent No.: US 11,937,223 B2
(45) Date of Patent: Mar. 19, 2024

(54) SIDELINK RESOURCE CONFIGURATION METHOD AND APPARATUS

(71) Applicant: Huawei Technologies Co., Ltd., Shenzhen (CN)

(72) Inventors: Ting Wang, Shanghai (CN); Hao Tang, Shanghai (CN); Xinxian Li, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 444 days.

(21) Appl. No.: 17/214,000

(22) Filed: Mar. 26, 2021

(65) Prior Publication Data

US 2021/0219292 A1 Jul. 15, 2021

Related U.S. Application Data

(63) Continuation of application No. PCT/CN2019/107240, filed on Sep. 23, 2019.

(30) Foreign Application Priority Data

Sep. 27, 2018 (CN) .......................... 201811134517.4

(51) Int. Cl.
  *H04W 72/0453* (2023.01)
  *H04W 72/23* (2023.01)
  *H04W 92/18* (2009.01)

(52) U.S. Cl.
  CPC ....... *H04W 72/0453* (2013.01); *H04W 72/23* (2023.01); *H04W 92/18* (2013.01)

(58) Field of Classification Search
  CPC .. H04W 72/0453; H04W 72/23; H04W 92/18
  See application file for complete search history.

(56) References Cited

U.S. PATENT DOCUMENTS

2013/0077718 A1 3/2013 Chavali
2016/0295624 A1 10/2016 Novlan et al.
(Continued)

FOREIGN PATENT DOCUMENTS

CN 103517275 A 1/2014
CN 105101431 A 11/2015
(Continued)

OTHER PUBLICATIONS

Huawei, HiSilicon, Resource allocation and indication for data channel. 3GPP TSG RAN WG1 Meeting #88bis, R1-1705069, Apr. 3-7, 2017, 8 pages, Spokane, USA.
(Continued)

*Primary Examiner* — Natasha W Cosme
(74) *Attorney, Agent, or Firm* — Slater Matsil, LLP

(57) ABSTRACT

This application provides a sidelink resource configuration method and apparatus. The method includes: configuring, by a network device, sidelink bandwidth part (SL BWP) configuration information for a terminal device, where the SL BWP configuration information is used to indicate a common first parameter of M resource pools in the SL BWP; and configuring, by the terminal device, the M resource pools in the SL BWP based on the SL BWP configuration information in a process of configuring the resource pools in the SL BWP, where the M resource pools have at least one same parameter, and the at least one parameter is determined based on the first parameter. Therefore, communication between different terminal devices can be implemented by configuring the resource pools in the SL BWP.

20 Claims, 11 Drawing Sheets

(56) References Cited

U.S. PATENT DOCUMENTS

| | | |
|---|---|---|
| 2017/0041902 A1 | 2/2017 | Sheng |
| 2017/0367087 A1 | 12/2017 | Seo |
| 2018/0054237 A1 | 2/2018 | Tseng et al. |
| 2018/0083716 A1 | 3/2018 | Cho et al. |
| 2018/0139778 A1 | 5/2018 | Chou et al. |
| 2018/0176955 A1 | 6/2018 | Salem et al. |

FOREIGN PATENT DOCUMENTS

| | | |
|---|---|---|
| CN | 106162900 A | 11/2016 |
| CN | 107360593 A | 11/2017 |
| CN | 107889238 A | 4/2018 |
| CN | 107911203 A | 4/2018 |
| CN | 108024364 A | 5/2018 |
| CN | 108512642 A | 9/2018 |
| WO | 2018084880 A1 | 5/2018 |
| WO | 2018144433 A1 | 8/2018 |
| WO | 2019170053 A1 | 9/2019 |

OTHER PUBLICATIONS

Huawei, HiSilicon, Sidelink physical layer structure and procedure for NR V2X. 3GPP TSG RAN WG1 Meeting #94, R1-1808093, Aug. 20-24, 2018, 6 pages, Gothenburg, Sweden.

3GPP TS 38.214 V15.2.0 (Jun. 2018), 3rd Generation Partnership Project; Technical Specification Group Radio Access Network; NR; Physical layer procedures for data (Release 15), 95 pages.

3GPP TS 38.212 V15.3.0 (Sep. 2018), 3rd Generation Partnership Project; Technical Specification Group Radio Access Network; NR; Multiplexing and channel coding(Release 15), 99 pages.

3GPP TS 38.331 V15.3.0 (Sep. 2018), 3rd Generation Partnership Project; Technical Specification Group Radio Access Network; NR; Radio Resource Control (RRC) protocol specification(Release 15), 445 pages.

Samsung, "Discussion on physical layer structures and procedures for NR V2X", 3GPP TSG RAN WG1 #94, R1-1808776, Aug. 20-24, 2018, 8 pages, Gothenburg, Sweden.

SIDELINK RESOURCE CONFIGURATION METHOD AND APPARATUS

CROSS-REFERENCE TO RELATED APPLICATIONS

This application is a continuation of International Application No. PCT/CN2019/107240, filed on Sep. 23, 2019, which claims priority to Chinese Patent Application No. 201811134517.4, filed on Sep. 27, 2018. The disclosures of the aforementioned applications are hereby incorporated by reference in their entireties.

TECHNICAL FIELD

This application relates to the communications field, and more specifically, to a sidelink resource configuration method and apparatus.

BACKGROUND

A bandwidth part (BWP) mechanism is introduced to a new radio (NR) system. A BWP is a part of system bandwidth, and is a segment of continuous or discontinuous frequency domain resources. A network device may configure one or more BWPs for a terminal device, and the terminal device may communicate with the network device on an active BWP in the one or more BWPs.

However, in the foregoing solution, only communication between the terminal device and the network device is considered during BWP configuration, but sidelink (SL) communication between different terminal devices is not considered. Therefore, a technology for BWP configuration needs to be provided, so that different terminal devices can communicate with each other.

SUMMARY

This application provides a sidelink resource configuration method and apparatus, to implement communication between different terminal devices.

According to a first aspect, a sidelink resource configuration method is provided. The method includes: obtaining, by a terminal device, a first parameter, where the first parameter is a common parameter of M resource pools in the SL BWP, frequency domain resources in the M resource pools are located in the SL BWP, and M is an integer greater than or equal to 1; and configuring, by the terminal device, the M resource pools, where at least one same parameter is configured for the M resource pools, and the at least one parameter is determined based on the first parameter.

The first parameter may be a common parameter, of the M resource pools, used by the terminal device in an actual communication process. In this case, the at least one parameter is the first parameter. The first parameter is a BWP-level parameter and is applicable to all resource pools in an SL BWP, and all the resource pools in the SL BWP have a same parameter feature.

Frequency domain resources in any two of the M resource pools may completely overlap, or may not overlap, or may partially overlap.

Therefore, according to the sidelink resource configuration method in this embodiment of this application, the terminal device may configure, in the SL BWP, a resource pool used by the terminal device to perform sidelink communication, and obtain the common first parameter of the resource pools in the SL BWP by using SL BWP configuration information, so that the at least one parameter determined based on the first parameter is applicable to all the resource pools in the SL BWP. In other words, the resource pools configured in the SL BWP have the at least one same parameter. In this way, communication between different terminal devices can be implemented by configuring the resource pools in the SL BWP.

In addition, in this embodiment of this application, signaling of a resource pool may not need to be configured for each resource pool. Instead, the SL BWP configuration information used to indicate the common first parameter of the resource pools in the SL BWP is configured. In other words, the first parameter may be designed for all the resource pools in the SL BWP. This conforms to a concept of a BWP, and a design is simple. Signaling overheads can be effectively reduced especially when the SL BWP includes a plurality of resource pools.

Optionally, the obtaining, by a terminal device, a first parameter includes: receiving, by the terminal device, the SL BWP configuration information, where the SL BWP configuration information is used to indicate the first parameter.

Optionally, the first parameter includes at least one of the following: a waveform, an uplink/downlink configuration of a frame structure, or a parameter set, and the parameter set includes a subcarrier spacing and/or a cyclic prefix CP.

The parameter set may be understood as a frame structure parameter, and is a set of parameters used to indicate the frame structure. The parameter set may include at least one of the subcarrier spacing or the CP, or may include a parameter used to indicate a quantity of symbols included in a subframe or a slot.

Optionally, the first parameter may further include at least:

a parameter adjacency PSCCH-PSSCH used to indicate whether a physical sidelink control channel (physical sidelink control channel, PSCCH) and a physical sidelink shared channel (physical sidelink shared channel, PSSCH) included in a resource pool are always adjacent to each other, which means that PSCCHs and PSSCHs of all the resource pools in the SL BWP may always be adjacent to each other, or may always not be adjacent to each other;

a parameter sync Config Index used to indicate synchronization configuration, which means that all the resource pools in the SL BWP may have a same synchronization configuration parameter;

a parameter SL-Sync Allowed used to indicate an allowed synchronization type, which means that all the resource pools in the SL BWP may have a same parameter used to indicate an allowed synchronization type, where the synchronization type may be a synchronization type such as satellite synchronization, base station synchronization, or terminal device synchronization; and a zone identifier Zone ID used to indicate a zone, which means that all the resource pools in the SL BWP may correspond to a same zone identifier, where the zone may be a zone obtained through division based on a geographical position, and specific zone division may be predefined, or may be configured by a network device for the terminal device. The zone identifier is used to identify a zone.

Optionally, the configuring, by the terminal device, the M resource pools includes: determining, by the terminal device, frequency domain positions of the M resource pools based on an SL BWP bandwidth size and a starting frequency domain unit of the SL BWP.

Therefore, according to the sidelink resource configuration method in this embodiment of this application, the terminal device may determine the frequency domain positions of the M resource pools based on the SL BWP bandwidth size and the starting frequency domain unit of the SL BWP. This avoids using signaling to indicate the frequency domain positions of the resource pools, thereby reducing indication overheads. In addition, the resource pools are located in the SL BWP. This facilitates coexistence of sidelink transmission and Uu air interface (universal UE to network interface) transmission. A Uu air interface is used for communication between the network device and the terminal device. In addition, a bandwidth of the SL BWP may correspond to a radio frequency bandwidth of a terminal. A plurality of SL BWPs may be configured to support a plurality of radio frequency bandwidth capabilities. Different parameters (for example, a frame structure parameter) may be configured for each SL BWP, so that flexible parameter configuration can be supported. In addition, different bandwidth sizes are configured for different SL BWPs, so that energy saving of the terminal device can also be implemented.

Optionally, an $i^{th}$ resource pool in the M resource pools includes N subchannels, where N is an integer greater than or equal to 1, and $i \in [1, M]$. Configuring, by the terminal device, the frequency domain positions of the M resource pools based on the SL BWP bandwidth size and the starting frequency domain unit of the SL BWP includes: configuring, by the terminal device, a frequency domain position of the $i^{th}$ resource pool based on a second parameter, where the second parameter includes: at least one of a subchannel bandwidth size or the quantity N of subchannels included in the $i^{th}$ resource pool, and a starting frequency domain unit of the first subchannel in the N subchannels, where the first subchannel occupies a lowest or highest frequency domain position in the N subchannels.

It may be understood that, the second parameter is a dedicated parameter configured by the terminal device for each resource pool, the M resource pools may correspond to M second parameters, and each resource pool is determined by using a corresponding second parameter.

The subchannel bandwidth size may be a reference value, and may be used to determine a bandwidth size of each subchannel. The reference value may be bandwidth sizes of at least some subchannels. The bandwidth sizes of the at least some subchannels herein represent bandwidth sizes of all subchannels or bandwidth sizes of some subchannels.

Therefore, according to the sidelink resource configuration method in this embodiment of this application, the terminal device determines a frequency domain position of each resource pool by using a related parameter (for example, the second parameter) of a subchannel. This can avoid directly configuring the resource pool. The subchannel may be determined by configuring the related parameter of the subchannel. By using the subchannel, indication overheads of a transmission resource in subsequent control information can be reduced, and the resource pool can be determined.

Optionally, the method further includes: receiving, by the terminal device, indication information used to indicate the second parameter.

Therefore, according to the sidelink resource configuration method in this embodiment of this application, the network device indicates, by using signaling, the related parameter (for example, the second parameter) of the subchannel, and a subchannel may include one or more resource blocks. Compared with a manner of directly indicating by using a resource block, in this manner, indication overheads of the transmission resource can be reduced.

Optionally, the $i^{th}$ resource pool is the first resource pool in the M resource pools, a starting frequency domain unit of the first subchannel in the first resource pool is the starting frequency domain unit of the SL BWP, and the first resource pool occupies a lowest or highest frequency domain position in the M resource pools; and/or if the second parameter includes the subchannel bandwidth size, the subchannel bandwidth size is determined based on a mapping relationship between the SL BWP bandwidth size and the subchannel bandwidth size.

Optionally, the SL BWP bandwidth size is determined based on a range of the SL BWP bandwidth size.

Therefore, according to the sidelink resource configuration method in this embodiment of this application, the starting frequency domain unit of the SL BWP is determined as the starting frequency domain unit of the first subchannel in the first resource pool in the M resource pools. This can avoid indicating the starting frequency domain unit of the first subchannel, thereby reducing signaling overheads. In addition, a starting resource unit of the SL BWP is used as a starting resource unit of the first subchannel, so that resources of the SL BWP can be fully used, thereby avoiding a waste of resources. A size of the subchannel is determined based on the mapping relationship between the SL BWP bandwidth size and the subchannel bandwidth size. This can avoid indicating the subchannel bandwidth size, thereby reducing signaling overheads. The subchannel bandwidth size is determined based on the SL BWP bandwidth size, and different subchannel bandwidth sizes may be determined based on different SL BWP bandwidth sizes. This can avoid an excessive quantity of subchannels, so that the subchannel can be properly designed.

Optionally, the starting frequency domain unit of the first subchannel is offset by $K_1$ frequency domain units from the starting frequency domain unit of the SL BWP, where $K_1$ is an integer greater than or equal to 0.

It may be understood that a reference position of starting frequency domain units of all subchannels including the first subchannel is the starting frequency domain unit of the SL BWP.

Therefore, the starting frequency domain unit of the SL BWP is used as the reference position of the starting frequency domain units of the subchannels, so that an index generated by a system in this manner may have a relatively small value, and correspondingly, the index occupies a relatively small quantity of bits. When a frequency domain unit in the SL BWP is indicated by using the index, occupied bits can be effectively reduced, thereby saving resources.

Optionally, the starting frequency domain unit of the first subchannel is offset by $K_2$ frequency domain units from a starting frequency domain unit of a first carrier, where the first carrier is a carrier to which the $i^{th}$ resource pool belongs, and $K_2$ is an integer greater than or equal to 0.

It may be understood that a reference position of starting frequency domain units of all subchannels including the first subchannel is the starting frequency domain unit of the carrier.

Optionally, an index value of the starting frequency domain unit of the first subchannel is a quantity of frequency domain units by which the starting frequency domain unit of the first subchannel is offset from the starting frequency domain unit of the first carrier.

Optionally, the first parameter includes the subcarrier spacing. Configuring, by the terminal device, the M resource pools includes: configuring, by the terminal device, the M resource pools based on the subcarrier spacing.

In other words, a remaining parameter (for example, the second parameter) that is obtained by the terminal device based on the subcarrier spacing in the first parameter and that is used to configure the resource pools is a parameter corresponding to the subcarrier spacing.

Optionally, the second parameter is determined based on the SL BWP bandwidth size and the starting frequency domain unit of the SL BWP.

Optionally, the M resource pools are all sending resource pools; or the M resource pools are all receiving resource pools; or when M is greater than 1, some of the M resource pools are sending resource pools, and a resource pool in the M resource pools other than the some resource pools is a receiving resource pool.

Optionally, the method further includes: determining, by the terminal device, indexes of the M resource pools, where the indexes of the M resource pools are determined based on a quantity of resource pools included in the SL BWP, or the indexes of the M resource pools are determined based on a quantity of resource pools included in a first carrier, and the first carrier is a carrier to which the SL BWP belongs.

Optionally, the method further includes: sending or receiving, by the terminal device, index information used to indicate the indexes of the M resource pools.

According to a second aspect, a sidelink resource configuration method is provided. The method includes: sending, by a network device, sidelink bandwidth part SL BWP configuration information, where the SL BWP configuration information includes a first parameter, the first parameter is a common parameter used to configure M resource pools in the SL BWP, frequency domain resources in the M resource pools are located in the SL BWP, and M is an integer greater than or equal to 1.

Therefore, according to the sidelink resource configuration method in this embodiment of this application, the network device sends, to a terminal device, the SL BWP configuration information that includes the common first parameter of the resource pools, so that when the terminal device configures the resource pools in the SL BWP, at least one parameter determined based on the first parameter is applicable to all the resource pools in the SL BWP. In other words, the resource pools configured in the SL BWP have the at least one same parameter. In this way, the terminal device can configure the resource pools in the SL BWP, so that communication between different terminal devices can be implemented.

In addition, in this embodiment of this application, signaling of a resource pool may not need to be configured for each resource pool. Instead, the SL BWP configuration information used to indicate the common first parameter of the resource pools in the SL BWP is configured. When the SL BWP includes a plurality of resource pools, signaling overheads can be effectively reduced.

Optionally, the first parameter includes at least one of the following: a waveform, an uplink/downlink configuration of a frame structure, or a parameter set, and the parameter set includes a subcarrier spacing and/or a cyclic prefix CP.

Optionally, an $i^{th}$ resource pool in the M resource pools includes N subchannels, where N is an integer greater than or equal to 1, and $i \in [1, M]$. The method further includes: sending, by the network device, indication information used to indicate a second parameter, where the second parameter includes: at least one of a subchannel bandwidth size and the quantity N of subchannels included in the $i^{th}$ resource pool, and a starting frequency domain unit of the first subchannel in the N subchannels, where the first subchannel occupies a lowest or highest frequency domain position in the N subchannels.

Therefore, according to the sidelink resource configuration method in this embodiment of this application, the terminal device determines a frequency domain position of each resource pool by using a related parameter (for example, the second parameter) of a subchannel. This can avoid directly configuring the resource pool. The subchannel may be determined by configuring the related parameter of the subchannel. By using the subchannel, indication overheads (for example, the indication information) of a transmission resource can be reduced, and the resource pool can be determined.

Optionally, the $i^{th}$ resource pool is the first resource pool in the M resource pools, a starting frequency domain unit of the first subchannel in the first resource pool is a starting frequency domain unit of the SL BWP, and the first resource pool occupies a lowest or highest frequency domain position in the M resource pools; and/or if the second parameter includes the subchannel bandwidth size, the subchannel bandwidth size is determined based on a mapping relationship between an SL BWP bandwidth size and the subchannel bandwidth size.

In this way, the starting frequency domain unit of the SL BWP is determined as the starting frequency domain unit of the first subchannel in the first resource pool in the M resource pools. This can avoid indicating the starting frequency domain unit of the first subchannel, thereby reducing signaling overheads. In addition, a starting resource unit of the SL BWP is used as a starting resource unit of the first subchannel, so that resources of the SL BWP can be fully used, thereby avoiding a waste of resources. A size of the subchannel is determined based on the mapping relationship between the SL BWP bandwidth size and the subchannel bandwidth size. This can avoid indicating the subchannel bandwidth size, thereby reducing signaling overheads. The subchannel bandwidth size is determined based on the SL BWP bandwidth size, and different subchannel bandwidth sizes may be determined based on different SL BWP bandwidth sizes. This can avoid an excessive quantity of subchannels, so that the subchannel can be properly designed.

Optionally, the starting frequency domain unit of the first subchannel is offset by $K_1$ frequency domain units from the starting frequency domain unit of the SL BWP, where $K_1$ is an integer greater than or equal to 0.

Therefore, the starting frequency domain unit of the SL BWP is used as a reference position of the starting frequency domain units of the subchannels, so that an index generated by a system in this manner may have a relatively small value, and correspondingly, the index occupies a relatively small quantity of bits. When a frequency domain unit in the SL BWP is indicated by using the index, occupied bits can be effectively reduced, thereby saving resources.

Optionally, an index value of the starting frequency domain unit of the first subchannel is a quantity of frequency domain units by which the starting frequency domain unit of the first subchannel is offset from the starting frequency domain unit of the SL BWP.

Optionally, the starting frequency domain unit of the first subchannel is offset by $K_2$ frequency domain units from a starting frequency domain unit of a first carrier, where the first carrier is a carrier to which the $i^{th}$ resource pool belongs, and $K_2$ is an integer greater than or equal to 0.

Optionally, an index of the starting frequency domain unit of the first subchannel is a quantity of frequency domain units by which the starting frequency domain unit of the first subchannel is offset from the starting frequency domain unit of the first carrier.

Optionally, the second parameter is determined based on the SL BWP bandwidth size and the starting frequency domain unit of the SL BWP.

Optionally, the M resource pools are all sending resource pools; or the M resource pools are all receiving resource pools; or when M is greater than 1, some of the M resource pools are sending resource pools, and a resource pool in the M resource pools other than the some resource pools is a receiving resource pool.

Optionally, the method further includes: determining, by the terminal device, indexes of the M resource pools, where the indexes of the M resource pools are determined based on a quantity of resource pools included in the SL BWP, or the indexes of the M resource pools are determined based on a quantity of resource pools included in a first carrier, and the first carrier is a carrier to which the SL BWP belongs.

Optionally, the method further includes: sending or receiving, by the network device, index information used to indicate the indexes of the M resource pools.

According to a third aspect, a sidelink resource configuration apparatus is provided. The apparatus may be configured to perform operations performed by the terminal device in any one of the first aspect or the possible implementations of the first aspect. Specifically, the apparatus may include modules and units configured to perform the operations performed by the terminal device in any one of the possible implementations of the first aspect.

According to a fourth aspect, a sidelink resource configuration apparatus is provided. The apparatus may be configured to perform operations performed by the network device in any one of the second aspect or the possible implementations of the second aspect. Specifically, the apparatus may include modules and units configured to perform the operations performed by the network device in any one of the possible implementations of the second aspect.

According to a fifth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the terminal device to perform the method according to any one of the possible implementations of the first aspect, or the execution enables the terminal device to implement the apparatus provided in the fifth aspect.

According to a sixth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the network device to perform the method according to any one of the possible implementations of the second aspect, or the execution enables the network device to implement the apparatus provided in the sixth aspect.

According to a seventh aspect, a chip system is provided. The chip system includes a memory and a processor. The memory is configured to store a computer program, and the processor is configured to: invoke the computer program from the memory and run the computer program, so that a communications device onto which the chip system is installed performs the method according to any one of the first aspect, the second aspect, or the possible implementations thereof.

According to an eighth aspect, a computer program product is provided. The computer program product includes computer program code. When the computer program code is run by a communications unit, a processing unit or a transceiver, and a processor of a communications device (for example, a network device or a terminal device), the communications device is enabled to perform the method according to any one of the first aspect, the second aspect, or the possible implementations thereof.

According to a ninth aspect, a computer-readable storage medium is provided. The computer-readable storage medium stores a program. The program enables a communications device (for example, a network device or a terminal device) to perform the method according to any one of the first aspect, the second aspect, or the possible implementations thereof.

According to a tenth aspect, a computer program is provided. When the computer program is executed on a computer, the computer is enabled to implement the method according to any one of the first aspect, the second aspect, or the possible implementations thereof.

DETAILED DESCRIPTION OF ILLUSTRATIVE EMBODIMENTS

Figure 1:
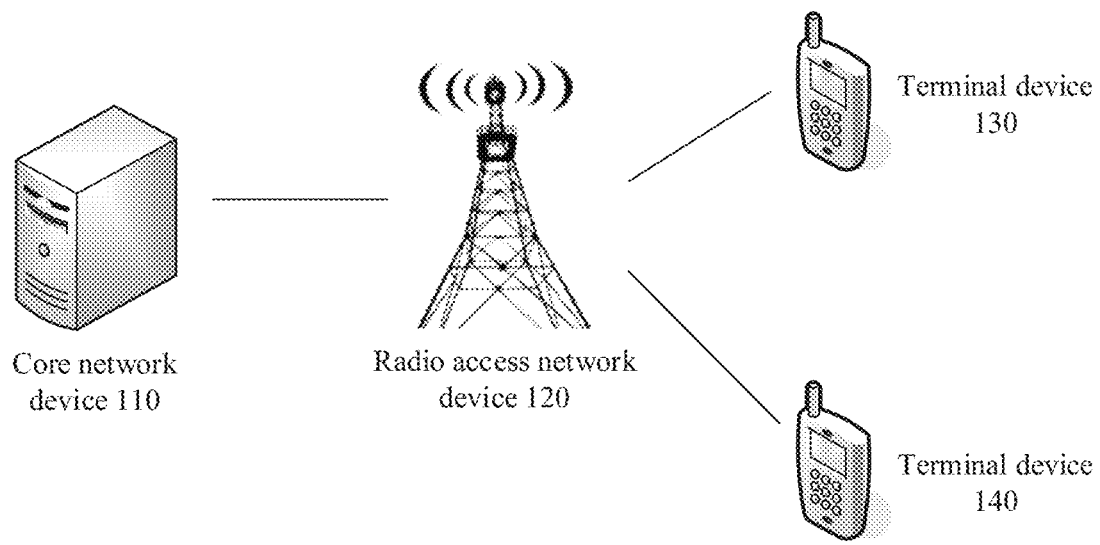
FIG. 1 is a schematic architectural diagram of a mobile communications system to which an embodiment of this application is applicable.

The following describes technical solutions of this application with reference to the accompanying drawings.

The technical solutions of embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, a NodeB (NB) in the wideband code division multiple access (WCDMA) system, an evolved NodeB (eNB or eNodeB) in the LTE system, or a radio controller in a cloud radio access network (CRAN) scenario. The network device may alternatively be a relay node, an access point, a vehicle-mounted device, a wearable device, a network device in the future 5G network, a network device in the future evolved PLMN network, or the like. This is not limited in the embodiments of this application.

The embodiments of this application are applicable to both a homogeneous network scenario and a heterogeneous network scenario, and no limitation is imposed on a transmission point. Coordinated multipoint transmission may be performed between macro base stations, between micro base stations, or between a macro base station and a micro base station. In addition, the embodiments of the present invention are applicable to both a low-frequency (sub 6G) scenario and a high-frequency (above 6G) scenario.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems, for example, a Linux operating system, a UNIX operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic architectural diagram of a mobile communications system to which an embodiment of this application is applicable. As shown in FIG. 1, the mobile communications system includes a core network device no, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices that are independent of each other, or functions of the core network device and logical functions of the radio access network device may be integrated into a same physical device, or some functions of the core network device and some functions of the radio access network device may be integrated into one physical device. The terminal device may be at a fixed position, or may be mobile. FIG. 1 is merely a schematic diagram. The communications system may further include another network device, for example, may further include a wireless relay device and a wireless backhaul device, which are not shown in FIG. 1. Quantities of core network devices, radio access network devices, and terminal devices included in the mobile communications system are not limited in this embodiment of this application.

For ease of understanding, related terms and related technologies in the embodiments of this application are first briefly described.

Resource Unit and Frequency Domain Unit

The resource unit may be used as a measurement unit of a resource occupied in time domain, frequency domain, or time-frequency domain. In the embodiments of this application, the resource unit may include, for example, at least one of a symbol, a resource element (RE), a resource block (RB), or a subcarrier. This is not limited in this application. In the embodiments of this application, the resource unit may be used as a measurement unit of a resource occupied in frequency domain. Therefore, the descriptions of the resource unit in the embodiments of this application may be understood as a resource unit in frequency domain. In addition, for ease of description, the resource unit in frequency domain may be referred to as a frequency domain unit.

Frame Structure

The frame structure may include a time domain unit such as a radio frame, a subframe, a slot, a mini-slot, a mini-slot, or a symbol.

Duration of a radio frame may be 10 milliseconds (ms). The radio frame may include one or more subframes. For example, if duration of a subframe is 1 millisecond, the radio frame may include 10 subframes, and the subframe may include one or more slots. Different subcarrier spacings may have different slot lengths. For example, when a subcarrier spacing is 15 kHz, a slot may be 1 ms; when a subcarrier spacing is 30 kHz, a slot may be 0.5 ms; and so on. A slot may include one or more symbols. For example, in a normal CP, the slot may include 14 symbols; or in an extended CP, the slot may include 12 symbols. By way of example, and not limitation, Table 1 shows lengths of a subframe, a radio frame, and a slot in a normal CP, and subcarrier spacings corresponding to the subframe, the radio frame, and the slot.

TABLE 1

| Subcarrier spacing $\mu$ | Quantity $N_{symb}^{slot}$ of symbols in a slot | Quantity $N_{slot}^{frame,\mu}$ of slots in a radio frame | Quantity $N_{slot}^{frame,\mu}$ of slots in a subframe |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Optionally, a subframe may include one or more mini-slots. A slot may include one or more mini-slots. The mini-slot may be a unit smaller than the slot. A mini-slot may include one or more symbols. For example, the mini-slot may include two symbols, four symbols, or seven symbols.

Frame Structure Parameter

The frame structure parameter may also be referred to as a parameter or a parameter set for short, and is collectively referred to as numerology as discussed in a standard. The frame structure parameter is a set of parameters that represent a frame structure, and includes at least a subcarrier spacing and/or a cyclic prefix (CP). Optionally, the frame structure parameter may further include a parameter such as a quantity of symbols included in a radio frame, a subframe, a slot, a mini-slot, or a mini-slot. Optionally, different frequency bands may use different frame structure parameters. To be specific, different frequency bands may use different subcarrier spacings (for example, 15 kHz, 30 kHz, or 60 kHz) and different CPs (for example, a normal CP, NCP; or an extended CP, ECP). Certainly, different frequency bands may alternatively use a same frame structure parameter, and a same frequency band may alternatively use different frame structure parameters.

Uplink/Downlink Configuration

Symbol types in wireless communication may include types such as an uplink symbol, a downlink symbol, and a flexible symbol.

In a slot in a downlink radio frame, the terminal device may assume that downlink transmission occurs only on the downlink symbol and/or the flexible symbol. In a slot in an uplink radio frame, the terminal device may assume that uplink transmission occurs only on the uplink symbol and/or the flexible symbol.

The uplink/downlink configuration is a configuration used to determine a symbol type. For example, a symbol type in one or more slots may be determined based on the uplink/downlink configuration, or a symbol type in one or more subframes may be determined based on the uplink/downlink configuration, or a symbol type in one or more radio frames may be determined based on the uplink/downlink configuration, or a symbol type in one or more mini-slots may be determined based on the uplink/downlink configuration.

The uplink/downlink configuration may also be referred to as time division multiplexing uplink/downlink configuration, slot format configuration, frame structure uplink/downlink configuration, or the like. In addition, signaling of the uplink/downlink configuration may be higher layer signaling or physical layer signaling.

BWP

The BWP is a part of a system bandwidth and is a segment of continuous or discontinuous frequency domain resources, and includes one or more continuous or discontinuous frequency domain units (for example, subcarriers).

In the embodiments of this application, the bandwidth part may also be referred to as a bandwidth resource, a carrier bandwidth part, a frequency resource part, a partial frequency resource, a subband, a narrowband, or another name.

Figure 2:
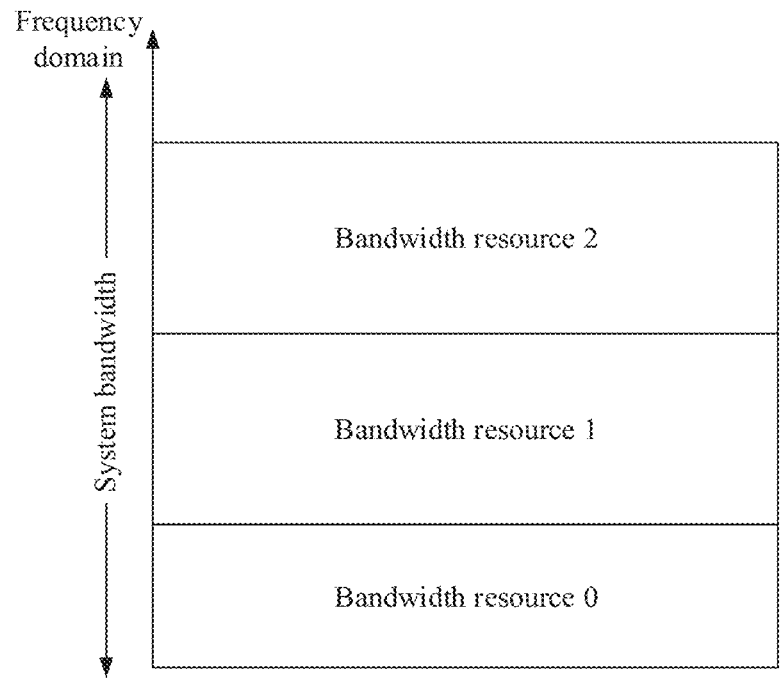
FIG. 2 is a schematic diagram of a bandwidth part of a system bandwidth according to an embodiment of this application.

For different bandwidth parts, frequency domain resources of two bandwidth parts may partially overlap, completely overlap, or completely do not overlap. This is not limited in the embodiments of this application. For example, FIG. 2 is a schematic diagram of a bandwidth part in a system bandwidth. The system bandwidth includes a bandwidth part 0, a bandwidth part 1, and a bandwidth part 2, and the three bandwidth parts do not overlap each other. For another example, in a communications system based on an orthogonal frequency division multiplexing (OFDM) technology, frequency domain resources of two bandwidth parts completely overlap, but frame structures (for example, subcarrier spacings and/or CP lengths) are different.

Common Index of a Frequency Domain Unit

A common index of a frequency domain unit represents an index of the frequency domain unit in a carrier. In other words, a common index of a frequency domain unit is designed by using a carrier as a reference object. Optionally, the carrier may be a subcarrier spacing-level carrier. Different subcarrier spacings correspond to different carriers. Specifically, frequency domain units are numbered from a starting frequency domain unit of the carrier in ascending or descending order of frequencies, so that any frequency domain unit in the carrier is a frequency domain unit obtained after S1 frequency domain units are offset from the starting frequency domain unit of the carrier, where S1 is an integer greater than or equal to 0.

In a carrier, different subcarrier spacings may correspond to different indexes of frequency domain units. For example, the frequency domain unit is a frequency domain resource corresponding to an RB. Frequency domain resources of an RB 0 and an RB 1 of 15 kHz may correspond to a frequency domain resource of an RB 0 of 30 kHz, and frequency domain resources of an RB 0 and an RB 1 of 30 kHz may correspond to a frequency domain resource of an RB 0 of 60 kHz.

Figure 3:
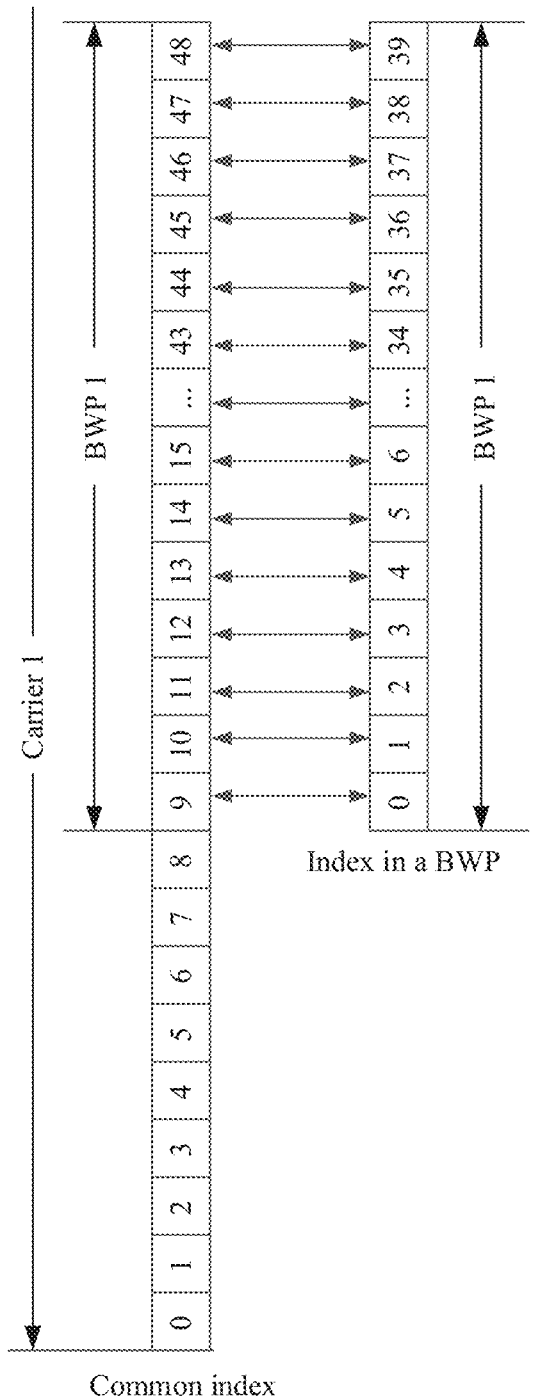
FIG. 3 is a schematic diagram of an index of a frequency domain resource, in a bandwidth part, separately located on a carrier and the bandwidth part according to an embodiment of this application.

For example, as shown in FIG. 3, in a carrier, an index (that is, a common index) of a starting frequency domain unit in the carrier is 0, and indexes are sequentially increased in ascending order of frequencies.

Index of a Frequency Domain Unit in a BWP

An index of a frequency domain unit in a BWP is designed by using the BWP as a reference object. Specifically, frequency domain units are numbered from a starting frequency domain unit of the BWP in ascending or descending order of frequencies, so that any frequency domain unit in the BWP is a frequency domain unit obtained after S2 frequency domain units are offset from the starting frequency domain unit of the BWP, where S2 is an integer greater than or equal to 0.

Still referring to FIG. 3, the carrier includes a BWP 1, a common index of a starting frequency domain unit of the BWP 1 is 9, and an index of the starting frequency domain unit of the BWP 1 in the BWP 1 is 0. Frequency domain units are numbered from the starting frequency domain unit of the BWP 1 in ascending order of frequencies, so that an index of a last frequency domain unit of the BWP in the BWP is 39 (a common index of the last frequency domain unit of the BWP is 48).

BWP Configuration

For the BWP configuration, the network device may configure the starting frequency domain unit of the BWP, a bandwidth size of the BWP, and the frame structure parameter (numerology) for the terminal device, so that the terminal device determines the BWP. The starting frequency domain unit of the BWP is a frequency domain unit at a highest or lowest frequency domain position in the BWP, and the bandwidth size may be represented as a quantity of frequency domain units included in the BWP.

In the embodiments of this application, the terminal device may determine the starting frequency domain unit of the BWP by using the following three offsets.

For ease of description, a process in which the terminal device determines the starting frequency domain unit of the BWP is described below by using an example in which the frequency domain unit is a frequency domain resource corresponding to an RB.

First Offset (Offset 1)

The first offset is a bandwidth size (for example, a quantity of RBs) by which a reference point is offset from a reference frequency position (reference location). The terminal device may determine the reference point based on the reference frequency position and the first offset by which the reference point is offset from the reference frequency position, and then may determine, based on the reference point, a common index of an RB corresponding to the reference point. The reference point may be understood as a starting RB of the carrier. The following describes reference frequency positions in different scenarios. For example, for a downlink carrier of a primary cell, the reference frequency position is determined based on an RB, whose frequency is lowest, corresponding to a synchronization signal block accessed by the terminal device;

for an uplink carrier of a primary cell of a non-paired spectrum, the reference frequency position is determined based on an RB, whose frequency is lowest, corresponding to a synchronization signal block accessed by the terminal device;

for an uplink carrier of a primary cell of a paired spectrum, the reference frequency position is determined based on a frequency position configured by the network device, and the frequency position may correspond to an absolute frequency number (absolute radio frequency channel number, ARFCN);

for a secondary cell, the reference frequency position is determined based on a frequency position configured by the network device, and the frequency position may correspond to an absolute frequency number ARFCN; and for a supplemental uplink carrier, the reference frequency position is determined based on a frequency position configured by the network device, and the frequency position may correspond to an absolute frequency number ARFCN.

Second Offset (Offset 2)

The second offset is a bandwidth size (for example, a quantity of RBs) by which a starting RB of a virtual carrier is offset from a reference point. The terminal device determines the starting RB of the virtual carrier based on the reference point and the second offset, and further needs to determine the virtual carrier based on a bandwidth, further configured by the network device, of the virtual carrier.

Herein, the virtual carrier may also be referred to as a logical carrier, a terminal device—specific carrier, an available RB, an available bandwidth, or the like. Based on the virtual carrier, the terminal device needs to determine a resource grid and an orthogonal frequency division multiplexing (OFDM) baseband signal, place a radio frequency (RF) transceiver, and/or perform filtering. Specifically, generation of the OFDM baseband signal is determined based on a size of the virtual carrier, namely, a quantity of RBs included in the virtual carrier. A virtual carrier with continuous frequencies is used as an example. Assuming that the virtual carrier includes $N_{grid}^{size}$ RBs, the OFDM baseband signal may be represented as:

$$s_l(t) = \sum_{k=0}^{N_{grid}^{size}N_{sc}^{RB}-1} a_{k,l} \cdot e^{j2\pi(k+k_0-N_{grid}^{size}N_{sc}^{RB}/2)\Delta f(t-N_{CP,l}T_c-t_{start,l})},$$

where $N_{sc}^{RB}$ represents a quantity of subcarriers included in an RB, for example, $N_{sc}^{RB}=12$; $k_0$ represents a subcarrier-level offset configured by the network device; $\Delta f$ represents a subcarrier spacing; $N_{CP,l}$ represents a CP length of an $l_{th}$ symbol; and $T_c$ represents a predefined time domain unit, and may be determined based on a maximum subcarrier spacing supported by a system and a quantity of FFT points. For example, if the maximum subcarrier spacing supported by the system is 480 kHz, and the quantity of FFT points is 4096, $T_c=1/(480 \cdot 10^3 \cdot 4096)$. $t_{start,l}$ represents a time domain position of the $l_{th}$ symbol or a time domain offset between the $l_{th}$ symbol and the $o^{th}$ symbol.

Third Offset (Offset 3)

The third offset is a bandwidth size (for example, a quantity of RBs) by which a starting RB of the BWP is offset from a starting RB of a virtual carrier. The terminal device may determine the starting RB of the BWP based on the third offset.

It can be learned that the starting frequency domain unit of the BWP is relative to the reference point, that is, relative to the starting frequency domain unit of the carrier.

In this way, after the starting RB of the BWP is determined based on the foregoing three offsets, a position of the BWP in the carrier may be determined based on the starting RB, the quantity of RBs included in the BWP, and the frame structure parameter.

Figure 4:
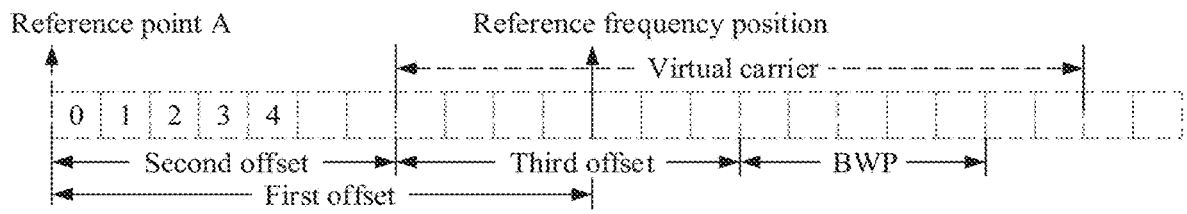
FIG. 4 is a schematic diagram of a frequency domain resource according to an embodiment of this application.

FIG. 4 shows a frequency domain resource according to an embodiment of this application. As shown in FIG. 4, a terminal device may determine a reference point A based on a first offset (offset 1) and a reference frequency position, determine an RB corresponding to the reference point A, determine a starting RB of a virtual carrier based on a second offset (offset 2) and the RB that corresponds to the reference point A, determine a starting RB of a BWP based on the starting RB of the virtual carrier and a third offset (offset 3), and determine a position of the BWP in the carrier based on the starting RB of the BWP, a bandwidth (for example, five RBs) of the BWP, and a frame structure parameter.

Sidelink Communication

Communication between terminal devices is referred to as sidelink communication. For example, communication modes in an internet of vehicles system may be collectively referred to as V2X communication, where V represents a vehicle, and X represents anything. Optionally, the V2X communication may include vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, vehicle-to-network (vehicle to network, V2N) communication, or the like.

The foregoing describes related terms and related technologies in the embodiments of this application. The following describes the embodiments of this application in detail with reference to FIG. 5 to FIG. 14.

In the embodiments of this application, a resource pool that can be used by the terminal device to perform SL communication is further configured in the BWP, so that the terminal device can perform SL communication. In the embodiments of this application, BWPs on which the terminal device can perform SL communication are collectively referred to as an SL BWP.

Figure 5:
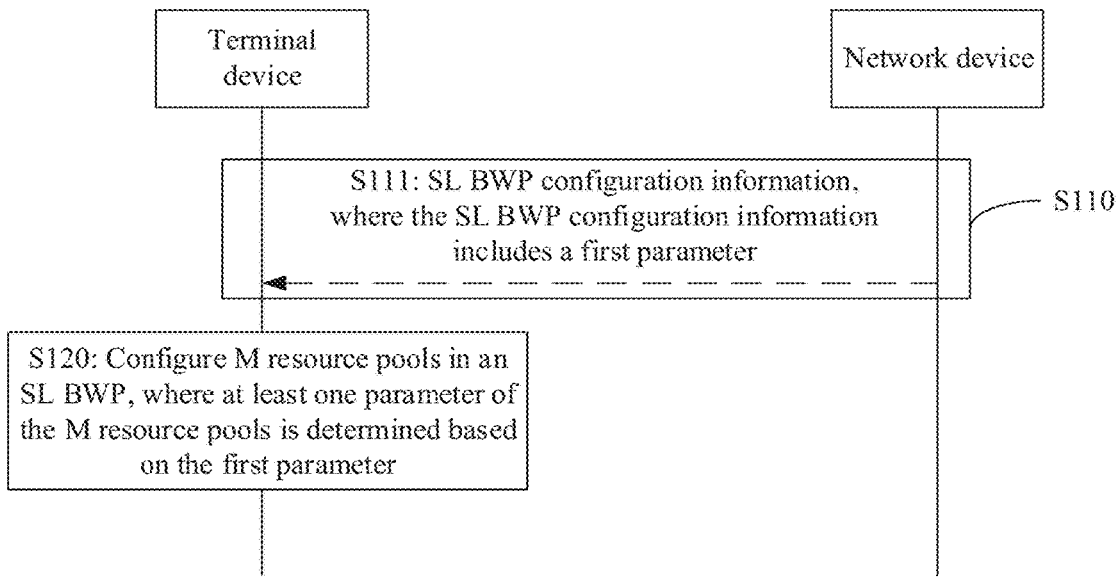
FIG. 5 is a schematic interaction diagram of a sidelink resource configuration method according to an embodiment of this application.

FIG. 5 is a schematic interaction diagram of a sidelink resource configuration method according to an embodiment of this application. The following describes the steps in this embodiment of this application. This embodiment may be used as an independent embodiment, or may be combined with another embodiment of the present invention. This is not limited in this application.

S110: A terminal device obtains a first parameter, where the first parameter is a common parameter of M resource pools in the SL BWP, frequency domain resources in the M resource pools are located in the SL BWP, and M is an integer greater than or equal to 1.

S120: The terminal device configures the M resource pools, where the M resource pools have at least one same parameter, and the at least one parameter is determined based on the first parameter.

Specifically, the terminal device may determine the SL BWP in this embodiment of this application in the foregoing BWP determining manner, obtain a common first parameter of the resource pools in a process of configuring the resource pools in the SL BWP, and determine a related parameter (namely, at least one parameter) of the M resource pools based on the first parameter. In other words, the M resource pools have the at least one same parameter.

Frequency domain resources in any two of the M resource pools may completely overlap, or may not overlap, or may partially overlap. This embodiment of this application is not limited thereto. It should be noted that, when the frequency domain resources in any two of the M resource pools overlap (completely overlap or partially overlap), different frame structures (for example, subcarrier spacings or CPs) may be configured for the resource pools whose frequency domain resources overlap, so that the resource pools whose frequency domain resources overlap transmit different data.

The following describes a relationship between the first parameter and the at least one parameter.

In a case, the first parameter may be a common parameter, of the M resource pools, used by the terminal device in an actual communication process. In this case, the terminal device may determine a first parameter in SL BWP configuration information as the related parameter (namely, the at least one parameter) of the M resource pools, so that the M resource pools have the at least one same parameter. It should be understood that, in this case, the at least one parameter is the first parameter. It may alternatively be understood that, the first parameter is a BWP-level parameter and is applicable to all resource pools in an SL BWP, and all the resource pools in the SL BWP have a same parameter feature.

In another case, the first parameter may be a common parameter pre-configured for the M resource pools, or a common parameter, expected by a network device or a system, of all the M resource pools. Therefore, the terminal device may use the first parameter when configuring the M resource pools. For example, the first parameter may include a plurality of parameter values. However, when each resource pool is actually configured, at least one parameter value may be selected from the first parameter to configure the resource pool, and at least one parameter determined from the first parameter is a parameter applicable to all the M resource pools. In this way, the M resource pools have the at least one same parameter. In this case, the at least one parameter is equal to one or more values of the first parameter. Optionally, the first parameter includes at least one of the following: a waveform, an uplink/downlink configuration of a frame structure, or a parameter set, and the parameter set includes a subcarrier spacing and/or a cyclic prefix CP.

The waveform indicates whether a single carrier or multiple carriers are used for data transmission, for example, whether cyclic prefix-orthogonal frequency division multiplexing access (CP-OFDMA) or discrete Fourier transform-spread-orthogonal frequency division multiplexing access (DFT-S-OFDMA) is used.

The uplink/downlink configuration of the frame structure indicates a resource used for uplink transmission, a resource used for downlink transmission, and a reserved resource in the SL BWP. Alternatively, at least one of a resource used for uplink transmission, a resource used for downlink transmission, and a reserved resource in the SL BWP may be determined based on the uplink/downlink configuration of the frame structure. It should be understood that, herein, the reserved resource may be a resource including the foregoing one or more flexible symbols, the resource used for uplink transmission may be a resource including the foregoing one or more uplink symbols, and the resource used for downlink transmission may be a resource including the foregoing one or more downlink symbols. Optionally, the resource used for downlink transmission cannot be used in SL communication, or the resource used for uplink transmission and/or the reserved resource may be used in SL communication. The parameter set may be understood as the foregoing frame structure parameter, and is a set of parameters used to indicate the frame structure. The parameter set may include at least one of the subcarrier spacing and the CP, or may include a parameter used to indicate a quantity of symbols included in a subframe or a slot. This is not limited herein.

It should be noted that, in the embodiments of this application, "at least one" represents "one or more", and the two descriptions may be interchanged.

By way of example, and not limitation, the first parameter may further include one or more of the following parameters:

- a parameter adjacency PSCCH-PSSCH used to indicate whether a physical sidelink control channel (PSCCH) and a physical sidelink shared channel (PSSCH) included in a resource pool are always adjacent to each other, which means that PSCCHs and PSSCHs of all the resource pools in the SL BWP may always be adjacent to each other, or may always not be adjacent to each other;
- a parameter sync Config Index used to indicate synchronization configuration, which means that all the resource pools in the SL BWP may have a same synchronization configuration parameter;
- a parameter SL-Sync Allowed used to indicate an allowed synchronization type, which means that all the resource pools in the SL BWP may have a same parameter used to indicate an allowed synchronization type, where the synchronization type may be a synchronization type such as satellite synchronization, base station synchronization, or terminal device synchronization; and
- a zone identifier Zone ID used to indicate a zone, which means that all the resource pools in the SL BWP may correspond to a same zone identifier, where the zone may be a zone obtained through division based on a geographical position, and specific zone division may be predefined, or may be configured by the network device for the terminal device. The zone identifier is used to identify a zone. It should be understood that the foregoing descriptions are merely examples of the first parameter. This embodiment of this application is not limited thereto. A common parameter used to configure all the resource pools in the SL BWP may be grouped into the first parameter. This should not constitute a limitation on this embodiment of this application.

S111 is used as an optional step of S110. Optionally, in S111, the network device sends the SL BWP configuration information. The network device may send the SL BWP configuration information by using RRC signaling, a system message, or another signaling. This is not limited in this application.

By way of example, and not limitation, the configuration information may alternatively be predefined or pre-configured. For example, the configuration information is predefined when the terminal device is delivered from a factory, or is pre-configured by an operator.

According to the sidelink resource configuration method in this embodiment of this application, a resource pool used by the terminal device to perform sidelink communication may be configured in the SL BWP, and the common first parameter of the resource pools in the SL BWP is obtained by using the SL BWP configuration information, so that the at least one parameter determined based on the first parameter is applicable to all the resource pools in the SL BWP. In other words, the resource pools configured in the SL BWP have the at least one same parameter. In this way, communication between different terminal devices can be implemented by configuring the resource pools in the SL BWP.

In addition, in this embodiment of this application, signaling of a resource pool may not need to be configured for each resource pool. Instead, the SL BWP configuration information used to indicate the common first parameter of the resource pools in the SL BWP is configured. When the SL BWP includes a plurality of resource pools, signaling overheads can be effectively reduced.

When communicating with another terminal device by using the resource pools or the SL BWP, the terminal device needs to determine a resource pool used to receive data and a resource pool used to send data. Therefore, the configured M resource pools in the SL BWP may be any one of the following types of resource pools:

- the M resource pools are all sending resource pools; or
- the M resource pools are all receiving resource pools; or
- when M is greater than 1, some of the M resource pools are sending resource pools, and a resource pool in the M resource pools other than the some resource pools is a receiving resource pool, where
- the sending resource pool indicates that the resource pool is used to send data, and the receiving resource pool indicates that the resource pool is used to receive data and is specifically used to receive data sent by the another terminal device.
- From the perspective of the SL BWP,
- the SL BWP is a sending SL BWP; or
- the SL BWP is a receiving SL BWP; or
- the SL BWP may be either of a sending SL BWP or a receiving SL BWP.

In other words, if the SL BWP is a sending SL BWP, the M resource pools in the SL BWP are all sending resource pools; if the SL BWP is a receiving SL BWP, the M resource pools in the SL BWP are all receiving resource pools; or if the SL BWP may be either of a sending SL BWP and a receiving SL BWP, the M resource pools may include a sending resource pool or a receiving resource pool, or some of the M resource pools are sending resource pools, and a resource pool in the M resource pools other than the some resource pools is a receiving resource pool.

This embodiment of this application describes a configuration manner of one SL BWP. During implementation, the terminal device may configure a plurality of SL BWPs for SL communication, and the SL BWPs are configured in a same manner, and may be implemented in the configuration manner according to this embodiment of this application. The following describes related features of the plurality of SL BWPs.

Optionally, the plurality of SL BWPs may be located on a same carrier, or may be located on different carriers.

Figure 6:
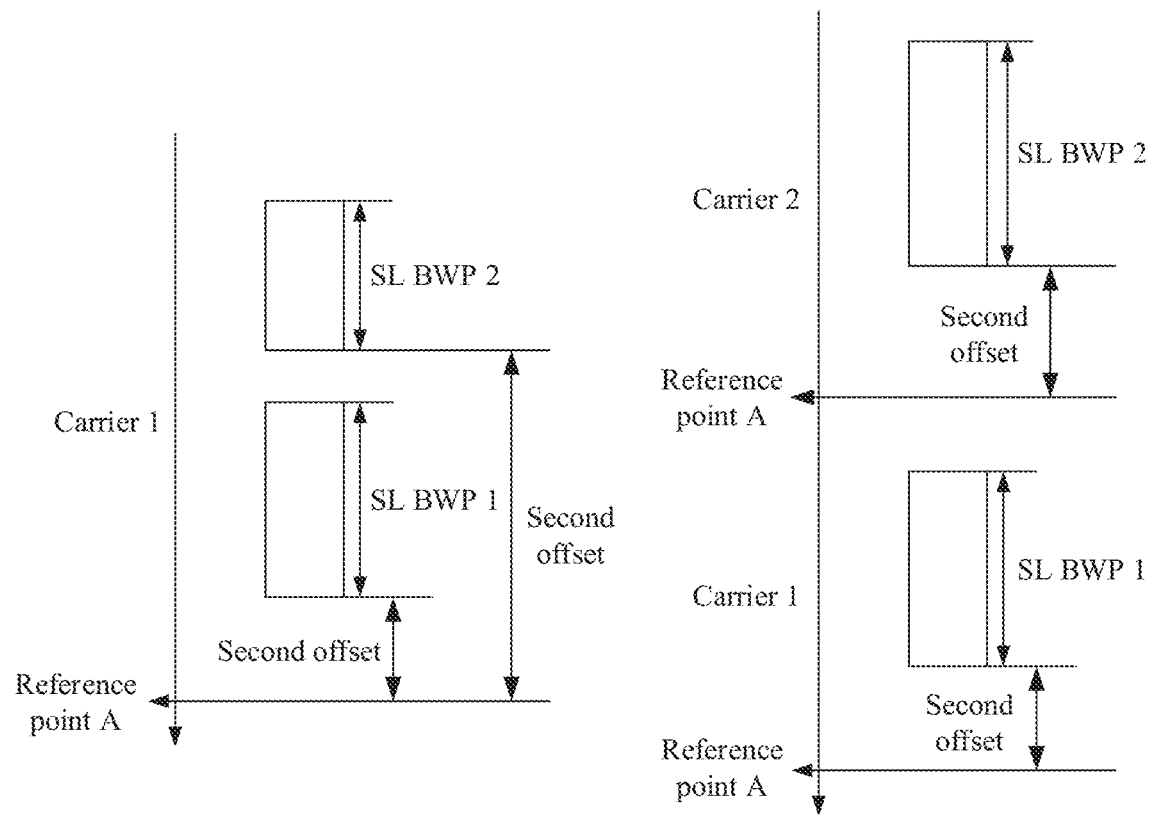
FIG. 6 is a schematic diagram of a position relationship between a bandwidth part and a carrier according to an embodiment of this application.

As shown in FIG. 6, starting frequency domain units of two SL BWPs in the left figure are both relative to a reference point A of a carrier 1, and the two SL BWPs are both located on the carrier 1. Two SL BWPs in the right figure are respectively located on different carriers. A starting frequency domain unit of an SL BWP 1 is relative to a reference point A of a carrier 1, and the SL BWP 1 is located on the carrier 1. A starting frequency domain unit of an SL BWP 2 is relative to a reference point A of a carrier 2, and the SL BWP 2 is located on the carrier 2.

Optionally, resource pools in any two SL BWPs may have a same attribute, or may have different attributes. For example, two SL BWPs are used as an example. One SL BWP is used to send data, and the other SL BWP is used to receive data. Alternatively, the two SL BWPs are both used to send data and/or receive data.

Optionally, the plurality of SL BWPs may have a same first parameter, or may have different first parameters. For example, two SL BWPs are used as an example. The two SL BWPs may have a same frame structure parameter and/or waveform, or the two SL BWPs may have different frame structure parameters and/or waveforms, or the two SL BWPs may have different uplink/downlink configurations of frame structures.

The foregoing describes the SL BWP in this embodiment of this application. The following describes a resource pool in the SL BWP in detail. This embodiment may be used as an independent embodiment, or may be combined with another embodiment of the present invention. This is not limited in this application.

In this embodiment of this application, the resource pool is configured in the SL BWP. To be specific, a frequency domain resource in one resource pool is located in one SL BWP. In other words, one resource pool is associated with one SL BWP.

Optionally, the frequency domain resource in one resource pool cannot exceed one SL BWP, or the frequency domain resource in one resource pool cannot be located in two SLBWPs.

For example, one or more resource pools may be indicated in the SL BWP configuration information. In other words, a frequency domain resource in the resource pool is located in an SL BWP to which the resource pool belongs. Alternatively, an SL BWP identifier may be indicated during resource pool configuration. In other words, the resource pool is associated with the SL BWP. That is, the frequency domain resource in the resource pool is located in the associated SL BWP.

It can be obviously learned from the foregoing descriptions that a frequency domain position of a resource pool in an SL BWP is related to the SL BWP. An embodiment may include determining, by the terminal device, frequency domain positions of the M resource pools based on an SL BWP bandwidth size and a starting frequency domain unit of the SL BWP, where the SL BWP bandwidth size may be represented as a quantity of frequency domain units included in the SL BWP, for example, a quantity of resource blocks included in the SL BWP.

This embodiment of this application provides four manners (namely, a manner 1, a manner 2, a manner 3, and a manner 4) of determining the frequency domain positions of the M resource pools. The following separately describes the four manners. Specifically, one or more of the following manners may be used. This embodiment may be used as an independent embodiment, or may be combined with another embodiment of the present invention. This is not limited in this application.

Manner 1

In SL communication, to reduce indication overheads for determining a transmission resource, the terminal device may configure a subchannel. The subchannel may include one or more frequency domain units. For example, the frequency domain unit is a resource block. One or more subchannels may form a frequency domain resource in a resource pool. Therefore, in this manner, a frequency domain position of each resource pool can be determined by using a related parameter of a subchannel.

In this manner, the frequency domain positions of the resource pools may be determined in similar manners. Therefore, for ease of description, any one (for example, an $i^{th}$ resource pool) of the M resource pools is used as an example to describe a process of determining a frequency domain position of a resource pool, where $i \in [1,M]$.

Optionally, the $i^{th}$ resource pool in the M resource pools includes N subchannels, where N is an integer greater than or equal to 1, $i \in [1,M]$, and each subchannel may include one or more frequency domain units. In some embodiments, the terminal device may configure the M resource pools based on the SL BWP bandwidth size and the starting frequency domain unit of the SL BWP. In one embodiment, configuring the M resource pools may further include: configuring, by the terminal device, the $i^{th}$ resource pool based on a second parameter, where the second parameter includes: at least one of a bandwidth size of one of the N subchannels and the quantity N of subchannels included in the $i^{th}$ resource pool, and a starting frequency domain unit of the first subchannel in the N subchannels, where the first subchannel occupies a lowest or highest frequency domain position in the N subchannels.

The $i^{th}$ resource pool in the M resource pools may be any one of the M resource pools.

It may be understood that, the second parameter is a dedicated parameter configured by the terminal device for each resource pool, the M resource pools may correspond to M second parameters, and each resource pool is determined by using a corresponding second parameter.

Herein, the subchannel bandwidth size is a reference value, and may be used to determine a bandwidth size of each subchannel. For example, the reference value may be bandwidth sizes of at least some subchannels. The bandwidth sizes of the at least some subchannels herein represent bandwidth sizes of all subchannels or bandwidth sizes of some subchannels. If the reference value is the bandwidth size of some subchannels, the reference value may be a bandwidth size of a subchannel in the N subchannels other than the first subchannel and/or a last subchannel. For actual consideration (for example, if a resource pool bandwidth size cannot be exactly divided by the subchannel bandwidth size when the network device configures the resource pool), a finally configured bandwidth size of the first subchannel and/or the last subchannel in the N subchannels may be different from the reference value.

Figure 7:
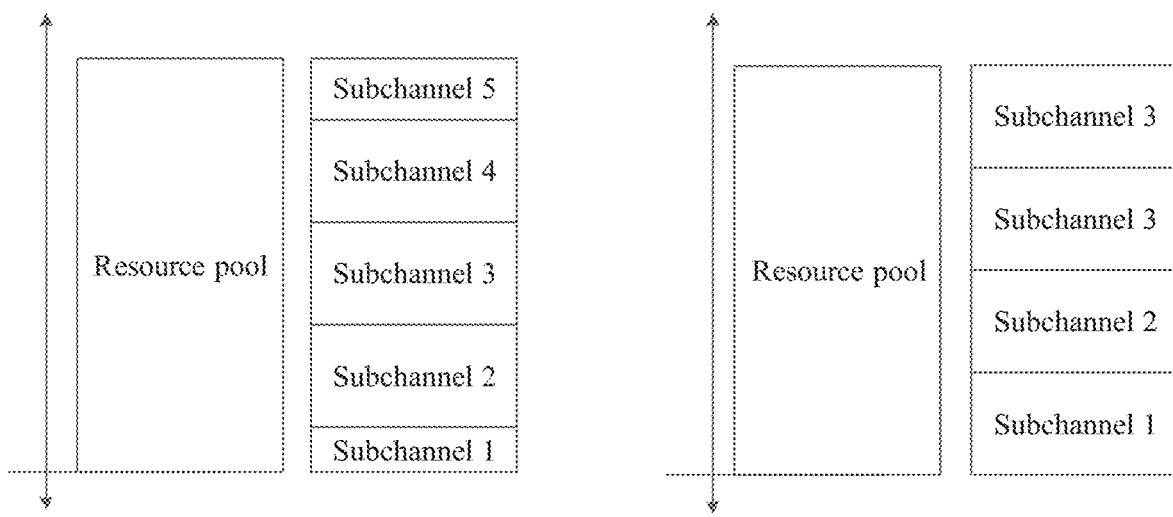
FIG. 7 is a schematic diagram of a subchannel in a resource pool according to an embodiment of this application.

FIG. 7 is another schematic diagram of a resource pool in an SL BWP. As shown in FIG. 7, in the left figure of FIG. 7, a resource pool 1 includes five subchannels. Bandwidth sizes of a subchannel 2, a subchannel 3, and a subchannel 4 each are a subchannel bandwidth size in a second parameter, and bandwidth sizes of a subchannel 1 and a subchannel 5 are different from the subchannel bandwidth size in the second parameter. In the right figure of FIG. 7, a resource pool 1 includes four subchannels. Bandwidth sizes of a subchannel 1, a subchannel 2, and a subchannel 3 each are a subchannel bandwidth size in a second parameter, and a bandwidth size of a subchannel 4 is different from the subchannel bandwidth size in the second parameter.

The following separately describes, in different cases of parameters included in the second parameter, that the terminal device determines the frequency domain position of the it h resource pool. The second parameter in this embodiment of this application may be any one of the following cases.

Case 1

The second parameter includes a subchannel bandwidth size, the quantity N of subchannels included in the $i^{th}$ resource pool, and a starting frequency domain unit of the first subchannel in the N subchannels.

In this case, the terminal device may determine N subchannels starting from the starting frequency domain unit of the first subchannel as the $i^{th}$ resource pool. A bandwidth size of each of the N subchannels may be determined based on the subchannel bandwidth size in the second parameter. For details, refer to the foregoing descriptions of determining a bandwidth size of a subchannel in the resource pool based on the subchannel bandwidth size in the second parameter. For brevity, details are not described herein again.

Case 2

The second parameter includes a subchannel bandwidth size, and a starting frequency domain unit of the first subchannel in the N subchannels.

This case is applicable to a scenario in which M=1.

In an implementation, starting from the starting frequency domain unit of the first subchannel, the terminal device may sequentially determine each subchannel based on the subchannel bandwidth size until all resources in an SL BWP are determined. A bandwidth size of each of the N subchannels may be determined based on the subchannel bandwidth size in the second parameter. For details, refer to the foregoing descriptions of determining a bandwidth size of a subchannel in the resource pool based on the subchannel bandwidth size in the second parameter. For brevity, details are not described herein again.

In another implementation, the terminal device may determine N based on an SL BWP bandwidth size and the subchannel bandwidth size, to determine N subchannels starting from the starting frequency domain unit of the first subchannel. For example, when the SL BWP bandwidth size is size $N_{size}^{SLBWP}$, and the subchannel bandwidth size is size $N_{size}^{subchannel}$, if the starting frequency domain unit of the first subchannel is not considered, a maximum quantity of subchannels that can be included in a BWP may be $N_{max} = \lceil N_{size}^{SLBWP} / N_{size}^{subchannel} \rceil$, where $N \leq N_{max}$; or if the starting frequency domain unit of the first subchannel is considered, a maximum quantity of subchannels that can be included in an SL BWP may be $\lceil (N_{size}^{SLBWP} - k) / N_{size}^{subchannel} \rceil$, where k is a quantity of frequency domain units by which the starting frequency domain unit of the first subchannel is offset from the starting frequency domain unit of the SL BWP. FIG. 3 is used as an example. It is assumed that the starting frequency domain unit of the first subchannel is a frequency domain unit whose common index is 11 or whose index in the BWP is 2. In this case, the frequency domain unit whose common index is 11 or whose index in the BWP is 2 is offset from the starting frequency domain unit (a frequency domain unit whose common index is 9 or whose index in the BWP is 0) of the BWP by two frequency domain units.

Case 3

The second parameter includes the quantity N of subchannels included in the $i^{th}$ resource pool, and a starting frequency domain unit of the first subchannel in the N subchannels.

This case is applicable to a scenario in which M=1. The terminal device may determine a reference value of a bandwidth size of each subchannel based on an SL BWP bandwidth size and N, to determine a size of each subchannel. N subchannels starting from the starting frequency domain unit of the first subchannel may be determined, to determine a size of the resource pool.

For example, when the SL BWP bandwidth size is size $N_{size}^{SLBWP}$, if the starting frequency domain unit of the first subchannel is not considered, the reference value of the subchannel bandwidth size may be $N_{size,1}^{subchannel} = \lceil N_{size}^{SLBWP} / N \rceil$. In this case, for bandwidth sizes of at least some subchannels, $N_{size}^{subchannel} \leq N_{size,1}^{subchannel}$. The bandwidth size of the at least some subchannels herein represents bandwidth sizes of all subchannels or bandwidth sizes of some subchannels. For example, the N subchannels have a same bandwidth size, and for a bandwidth size of each subchannel, $N_{size}^{subchannel} \leq N_{size,1}^{subchannel}$. For another example, subchannels at middle positions of the N subchannels have a same bandwidth size, and for a bandwidth size of each subchannel, $N_{size}^{subchannel} \leq N_{size,1}^{subchannel}$. A bandwidth size of the first subchannel and a bandwidth size of a last subchannel are different from the bandwidth size of the subchannel at the middle position.

Optionally, in this embodiment of this application, the network device may notify, by using signaling, the terminal device of information about the quantity M of resource pools included in the SL BWP. Alternatively, information about the quantity M of resource pools included in the SL BWP may be predefined in a protocol.

In this manner, at least one parameter in the second parameter may be sent by the network device to the terminal device by using the signaling, or may be determined by the terminal device in a predefined manner. The following separately describes manners of obtaining the second parameter. One or more of the following manners may be used.

Manner 1A

The second parameter is sent by the network device to the terminal device by using the signaling.

In this case, before sending the second parameter, the network device may determine all subchannels in the SL BWP, divide the subchannels into different resource pools to generate the second parameter, and then send the second parameter to the terminal device. The terminal device determines the resource pools based on the second parameter. The following briefly describes, by using an example, a process in which the network device determines the subchannels and the resource pools.

Optionally, the network device determines the frequency domain positions of the M resource pools based on the SL BWP bandwidth size, the starting frequency domain unit of the SL BWP, the subchannel bandwidth size, and M.

In a possible implementation, starting from the starting frequency domain unit of the SL BWP, the network device may roughly evenly divide frequency domain resources of the SL BWP into M resource pools based on the SL BWP bandwidth size, and one frequency domain resource is one resource pool. In this way, a frequency domain position of each resource pool can be determined, and a quantity of subchannels included in each resource pool is determined based on the subchannel bandwidth size and a bandwidth size of each resource pool, so that a position of a subchannel in each resource pool can be further determined. Therefore, a second parameter corresponding to each resource pool is generated.

Figure 8:
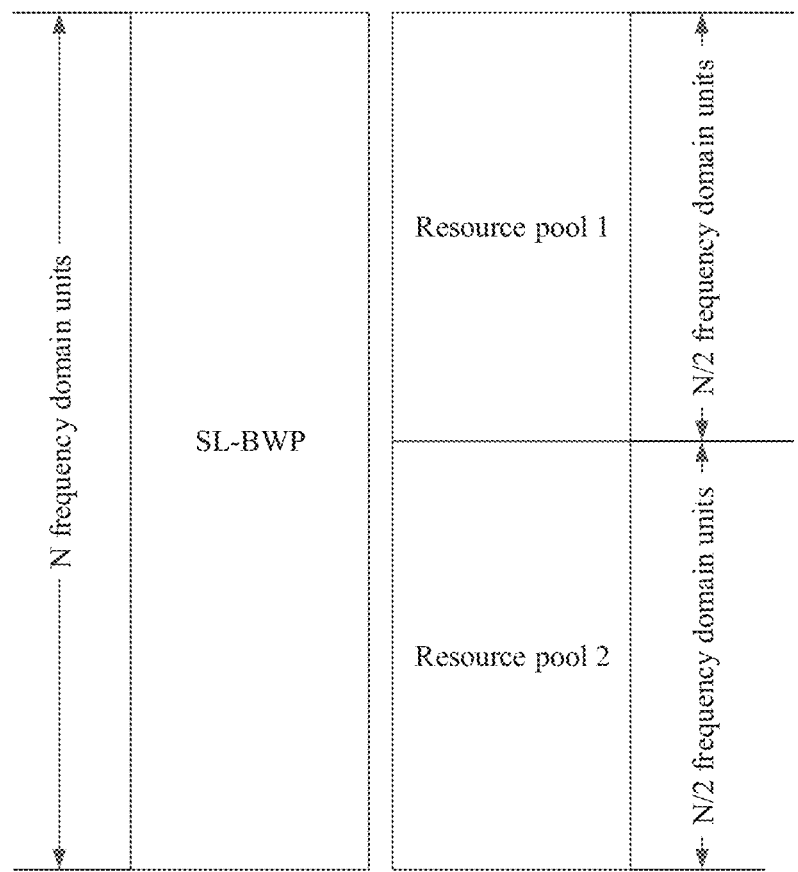
FIG. 8 is a schematic diagram of a resource pool in an SL BWP.

FIG. 8 is a schematic diagram of a resource pool in an SL-BWP. As shown in FIG. 8, the SL-BWP includes N frequency domain units, and M=2. In this case, the first resource pool (namely, a resource pool 1) may include N/2 frequency domain units, and the second resource pool (namely, a resource pool 2) may include N/2 frequency domain units.

It should be noted that, if the SL-BWP bandwidth size cannot be exactly divided by M, an operation of rounding up or rounding down may be performed. A bandwidth size of a resource pool is set to be different from bandwidth sizes of other resource pools, and the bandwidth sizes of the other resource pools are the same. For example, an SL BWP includes 30 frequency domain units, and M=4. If $\lceil 30/4 \rceil=8$, first three resource pools may each include eight frequency domain units, and the fourth resource pool includes six frequency domain units; or if $\lfloor 30/4 \rfloor=7$, first three resource pools may each include seven frequency domain units, and the fourth resource pool includes nine frequency domain units.

Similarly, when a quantity of subchannels included in each resource pool is determined based on a bandwidth size of each resource pool and a subchannel bandwidth size, if a resource pool bandwidth size cannot be exactly divided by the subchannel bandwidth size, an operation of rounding up or rounding down may be performed. A quantity of subchannels in a resource pool is set to be different from quantities of subchannels in other resource pools, and the quantities of subchannels in the other resource pools are the same.

In another possible implementation, the network device may determine a maximum quantity $N_{max}$ of subchannels in the SL BWP based on the SL BWP bandwidth size and the subchannel bandwidth size, determine a quantity N1 of subchannels included in the SL BWP based on $N_{max}$, determine frequency domain positions of the N1 subchannels in the SL BWP based on the starting frequency domain unit of the SL BWP and N1, and determine a frequency domain position of each of the M resource pools based on the frequency domain positions of the N1 subchannels and M, for example, roughly evenly divide the N1 subchannels into subchannels of the M resource pools. Therefore, a second parameter corresponding to each resource pool is generated.

It should be noted that, if N1 cannot be exactly divided by M, an operation of rounding up or rounding down may be performed. A quantity of subchannels in a resource pool is set to be different from quantities of subchannels in other resource pools, and the quantities of subchannels in the other resource pools are the same.

The quantity N1 of subchannels included in the SL BWP may be determined in the following manner. When the SL BWP bandwidth size is size $N_{size}^{SLBWP}$, and the subchannel bandwidth is size $N_{size}^{subchannel}$, if a starting frequency domain unit of the first subchannel in the N1 subchannels is not considered, a maximum quantity of subchannels that can be included in the SL BWP may be $N_{max} = \lceil N_{size}^{SLBWP} / N_{size}^{subchannel} \rceil$, where N1≤$N_{max}$; or if a starting frequency domain unit of the first subchannel is considered, a maximum quantity of subchannels that can be included in the SL BWP may be $\lceil (N_{size}^{SLBWP}-k)/N_{size}^{subchannel} \rceil$, where k is a quantity of frequency domain units by which the starting frequency domain unit of the first subchannel is offset from the starting frequency domain unit of the SL BWP.

The following briefly describes, by using an example, generation of the second parameter based on the foregoing manner in which the network device generates the second parameter.

Subchannel Bandwidth Size

Optionally, the subchannel bandwidth size is determined based on a mapping relationship between the SL BWP bandwidth size and the subchannel bandwidth size.

For example, if the SL BWP bandwidth size is B1, the subchannel bandwidth size is b1; if the SL BWP bandwidth size is B2, the subchannel bandwidth size is b2; and so on. By way of example, and not limitation, the mapping relationship between the SL BWP bandwidth size and the subchannel bandwidth size may be shown in the following Table 2 and Table 3. Table 3 is a table generated after specific values are assigned to B1, B2, B3, B4, b1, b2, b3, and b4 in Table 2, where B1, B2, B3, B4, b1, b2, b3, and b4 are positive integers.

TABLE 2

| SL BWP bandwidth size | Subchannel bandwidth size |
|---|---|
| B1 | b1 |
| B2 | b2 |
| B3 | b3 |
| B4 | b4 |

TABLE 3

| SL BWP bandwidth size | Subchannel bandwidth size |
|---|---|
| 20 | 2 |
| 50 | 5 |
| 150 | 10 |
| 200 | 20 |

Optionally, the subchannel bandwidth size is determined based on a mapping relationship between a range of the SL BWP bandwidth size and the subchannel bandwidth size.

For example, if the range of the SL BWP bandwidth size is C1-C2, the subchannel bandwidth size is c1; if the range of the SL BWP bandwidth size is C3-C4, the subchannel bandwidth size is c2; and so on.

By way of example, and not limitation, the mapping relationship between the range of the SL BWP bandwidth size and the subchannel bandwidth size may be shown in the following Table 4 and Table 5. Table 5 is a table generated after specific values are assigned to C1, C2, C3, C4, C5, C6, C7, C8, c1, c2, C3, and c4 in Table 4, where C1, C2, C3, C4, C5, C6, C7, C8, C1, c2, C3, and c4 are positive integers.

TABLE 4

| SL BWP bandwidth size | Subchannel bandwidth size |
|---|---|
| C1-C2 | c1 |
| C3-C4 | c2 |
| C5-C6 | c3 |
| C7-C8 | c4 |

TABLE 5

| SL BWP bandwidth size | Subchannel bandwidth size |
|---|---|
| 1-36 | 2 |
| 37-72 | 4 |
| 73-144 | 8 |
| 145-275 | 16 |

Herein, the mapping relationship between the SL BWP bandwidth size and the subchannel bandwidth size, or the mapping relationship between the range of the SL BWP bandwidth size and the subchannel bandwidth size may be specified in a system or a protocol. This is not limited herein.

Quantity N of Subchannels Included in a Resource Pool

As described above, the quantity N of subchannels in the resource pool may be related to M, the subchannel bandwidth size, and the SL BWP bandwidth size. The network device may determine, based on the foregoing three parameters, the quantity N of subchannels included in the resource pool. For a specific manner, refer to the foregoing descriptions. For brevity, details are not described herein again.

Starting Frequency Domain Unit of the First Subchannel

Herein, the starting frequency domain unit of the first subchannel may be the starting frequency domain unit of the resource pool, or may not be the starting frequency domain unit of the resource pool. The resource pool may include two parts of resources. For example, one part is a scheduling assignment (SA) resource, where the resource is used to transmit scheduling information; and the other part is a data resource, where the resource is used to transmit data. In the resource pool, the SA resource may be adjacent to the data resource in frequency domain, or may not be adjacent to the data resource in frequency domain. Therefore, the following describes the starting frequency domain unit of the first subchannel based on whether the SA resource is adjacent to the data resource. One or more of the following cases may be used.

The SA resource is adjacent to data resource.

Optionally, the starting frequency domain unit of the first subchannel may be a starting frequency domain unit of each resource pool.

In this embodiment of this application, a quantity of frequency domain units of the SA resource included in the subchannel may be predefined, or may be notified by the network device to the terminal device by using signaling. For example, the SA resource may be two resource blocks, four resource blocks, or another positive integer quantity of resource blocks.

Optionally, there is a correspondence between an SA resource and a data resource, and a subchannel may include both an SA resource and a data resource. A data resource of a subchannel may correspond to an SA resource of the subchannel.

Optionally, the SA resource may be a starting frequency domain unit located in a subchannel resource. In this case, a starting frequency domain unit of the SA resource may also be a starting frequency domain unit of each resource pool.

The SA resource is not adjacent to the data resource.

Optionally, the starting frequency domain unit of the first subchannel may be a starting frequency domain unit of each resource pool.

Optionally, a subchannel includes only a data resource.

Figure 9:
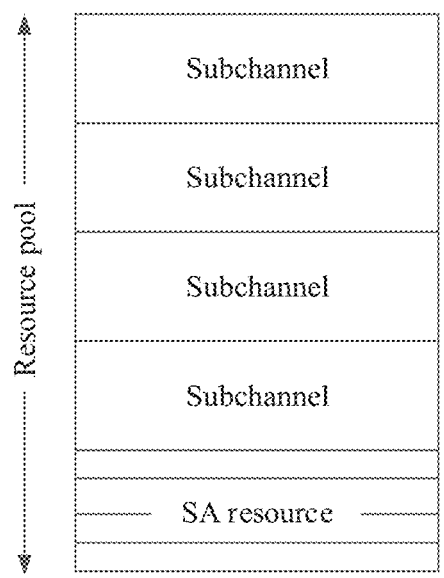
FIG. 9 is a schematic diagram of a position relationship between a scheduling resource and a data resource in a resource pool according to an embodiment of this application.

Optionally, there is a correspondence between an SA resource and a data resource. For example, a data resource of a subchannel may correspond to an SA resource. FIG. 9 is a schematic diagram of an SA resource in a resource pool and a data resource. As shown in FIG. 9, from bottom to top, SA resources are respectively the first SA resource, the second SA resource, the third SA resource, and the fourth SA resource. From bottom to top, subchannels are respectively the first subchannel, the second subchannel, the third subchannel, and the fourth subchannel. A correspondence between an SA resource and a data resource may be specifically as follows: The first subchannel corresponds to the first SA resource, the second subchannel corresponds to the second SA resource, the third subchannel corresponds to the third SA resource, and the fourth subchannel corresponds to the fourth SA resource.

Optionally, still as shown in FIG. 9, a starting frequency domain unit of an SA resource may be a starting frequency domain unit of each resource pool. In this case, a starting frequency domain unit of the first subchannel may be determined based on the SA resource. For example, the starting frequency domain unit of the first subchannel is the first frequency domain unit after a last frequency domain unit of the SA resource.

Optionally, a starting frequency domain unit of a data resource is a starting frequency domain unit of a resource pool, or a starting frequency domain unit of an SA resource is a starting frequency domain unit of a resource pool. Which of the foregoing two cases is specifically used may be predefined in a protocol, or may be notified by the network device to the terminal device by using signaling.

Figure 10:
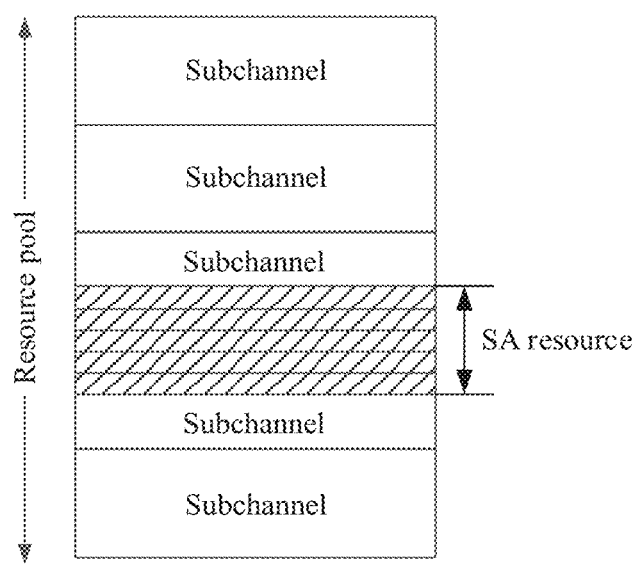
FIG. 10 is another schematic diagram of a position relationship between a scheduling resource and a data resource in a resource pool according to an embodiment of this application.

In addition, FIG. 10 is another schematic diagram of an SA resource in a resource pool and a data resource. As shown in FIG. 10, an SA resource and a subchannel resource may also be shared.

In this embodiment of this application, a quantity of frequency domain units of the SA resource may be predefined, or may be notified by the network device to the terminal device by using signaling. For example, the SA resource may be two resource blocks, four resource blocks, or another positive integer quantity of resource blocks.

Manner 1B

The terminal device determines the second parameter.

In a possible implementation, M=1. A process in which the terminal device determines the resource pool is as follows: The terminal device may determine a maximum quantity $N_{max}$ of subchannels in the SL BWP based on the SL BWP bandwidth size and the subchannel bandwidth size, determine the quantity N of subchannels included in the resource pool (or the SL BWP) based on $N_{max}$, and determine frequency domain positions of the N subchannels in the resource pool based on the starting frequency domain unit of the SL BWP and N, to determine the resource pool.

In this case, the starting frequency domain unit of the first subchannel may be the starting frequency domain unit of the SL BWP, or may be a frequency domain unit that is offset by k frequency domain units from the starting frequency domain unit of the SL BWP, where k may be notified by the network device by using signaling, or may be specified in a system or a protocol.

Optionally, the subchannel bandwidth size may be determined based on a mapping relationship between the SL BWP bandwidth size and the subchannel bandwidth size, or may be determined based on a mapping relationship between a range of the SL BWP bandwidth size and the subchannel bandwidth size. The mapping relationship may be specified in a protocol or a system. As described in the foregoing embodiment, details are not described herein again.

By way of example, and not limitation, the second parameter may further include another parameter only for each resource pool. For example, if the first parameter includes the waveform, but does not include the uplink/downlink configuration of the frame structure and the parameter set, the second parameter may include the uplink/downlink configuration of the frame structure and the parameter set. Similarly, if the first parameter includes the waveform and the uplink/downlink configuration of the frame structure, but does not include the parameter set, the second parameter includes the parameter set.

Manner 2

In this manner, the resource pool may not need to be determined by using the subchannels in Manner 1, but may be determined by the terminal device.

Optionally, determining, by the terminal device, frequency domain positions of the M resource pools based on an SL BWP bandwidth size and a starting frequency domain unit of the SL BWP includes: determining, by the terminal device, the frequency domain positions of the M resource pools based on the SL BWP bandwidth size, the starting frequency domain unit of the SL BWP, and M.

Optionally, the network device may notify, by using signaling, the terminal device of information about the quantity M of resource pools included in the SL BWP. Alternatively, information about the quantity M of resource pools may be predefined in a protocol.

For example, starting from the starting frequency domain unit of the SL BWP, the terminal device may evenly divide frequency domain resources of the SL BWP into M resource pools based on the SL BWP bandwidth size, and one frequency domain resource is one resource pool. In this way, a frequency domain position of each resource pool can be determined. Refer to the foregoing descriptions of FIG. 8.

Similarly, if the SL-BWP bandwidth size cannot be exactly divided by M, an operation of rounding up or rounding down may be performed. A bandwidth size of a resource pool is set to be different from bandwidth sizes of other resource pools, and the bandwidth sizes of the other resource pools are the same. For specific descriptions, refer to the first implementation of the network device in Manner 1A. For brevity, details are not described herein again.

Optionally, M may be predefined in a protocol, or may be configured by the network device for the terminal device by using the signaling. This is not limited herein.

As described above, in SL communication, to reduce indication overheads for determining a transmission resource, the terminal device may continue to determine at least one subchannel in the resource pool. The subchannels may be configured in the resource pools in a same manner. Therefore, for ease of description, one resource pool is used as an example to describe a process in which the terminal device configures at least one subchannel in a resource pool, and a process in which the terminal device configures a subchannel in another resource pool may be similar to the process. The following describes a process of determining a subchannel in three manners. In an implementation process, any one of the following manners may be used.

Manner 2A

Optionally, the terminal device may determine, based on the subchannel bandwidth size and a resource pool bandwidth size, a quantity of subchannels included in the resource pool, and may further determine a position of each subchannel in the resource pool based on the starting frequency domain unit of the first subchannel.

The subchannel bandwidth size may be determined based on a mapping relationship between the subchannel bandwidth size and the SL BWP, or may be determined based on a mapping relationship between a range of the subchannel bandwidth size and the SL BWP. The mapping relationship may be specified in a system or a protocol. The starting frequency domain unit of the first subchannel may be the starting frequency domain unit of the resource pool, or may not be the starting frequency domain unit of the resource pool. For specific descriptions, refer to the descriptions of the starting frequency domain unit of the first subchannel in the foregoing manner 1A. For brevity, details are not described herein again.

Manner 2B

Optionally, the terminal device may alternatively determine the subchannel bandwidth size based on a quantity of subchannels included in the resource pool and a resource pool bandwidth size, and may further determine a position of each subchannel in the resource pool based on the starting frequency domain unit of the first subchannel.

The quantity of subchannels included in the resource pool may be specified in a system or a protocol, or may be sent by the network device to the terminal device by using signaling. The starting frequency domain unit of the first subchannel may be the starting frequency domain unit of the resource pool, or may not be the starting frequency domain unit of the resource pool. For specific descriptions, refer to the descriptions of the starting frequency domain unit of the first subchannel in the foregoing manner 1A. For brevity, details are not described herein again.

Manner 2C

Optionally, the terminal device may determine a position of a subchannel in the resource pool based on the subchannel bandwidth size, a resource pool bandwidth size, and the starting frequency domain unit of the first subchannel. For a manner of determining the subchannel bandwidth size, the resource pool bandwidth size, and the starting frequency domain unit of the first subchannel, refer to the foregoing descriptions.

Manner 3

Frequency domain resources in a plurality of resource pools determined in this manner may not overlap, or may partially overlap, or frequency domain resources in a resource pool may include frequency domain resources in another resource pool.

Optionally, a frequency domain position of a resource pool may be determined based on a starting frequency domain unit of the first subchannel, a subchannel bandwidth size, and a quantity of subchannels included in the resource pool. In this manner, when M is greater than or equal to 1, an $i^{th}$ resource pool is determined based on a frequency domain resource in an $(i-1)^{th}$ resource pool, where i is greater than or equal to 2. For example, after a frequency domain resource in the first resource pool is determined starting from the starting frequency domain unit of the first subchannel, a starting frequency domain unit of the $i^{th}$ resource pool is the first frequency domain unit after an ending frequency domain unit of an $(i-1)^{th}$ resource. For another example, a starting frequency domain unit of the $i^{th}$ resource pool may be determined based on a quantity of overlapping frequency domain units in the $i^{th}$ resource pool and the $(i-1)^{th}$ resource pool. For example, the quantity of overlapping frequency domain units may be predefined in a protocol, or may be notified by the network device to the terminal device by using signaling. In this case, the starting frequency domain unit of the $i^{th}$ resource pool is a frequency domain unit obtained after the ending frequency domain unit of the $(i-1)^{th}$ resource pool is offset by a corresponding quantity of overlapping resource units.

Manner 4

This manner is similar to Manner 2. A difference is that the network device determines the M resource pools in Manner 2, and sends a related parameter about a frequency domain position of each resource pool to the terminal device, and the terminal device determines the M resource pools based on the received parameter. For specific descriptions, refer to Manner 2. Details are not described herein again.

In a possible implementation, the parameter may include a quantity of frequency domain units in an $i^{th}$ resource pool and a starting frequency domain unit of the $i^{th}$ resource pool. The $i^{th}$ resource pool is any one of the M resource pools.

Optionally, the quantity of frequency domain units may also be referred to as a bandwidth of the resource pool.

Optionally, a position of a frequency domain unit of the $i^{th}$ resource pool may be determined based on the starting frequency domain unit of the $i^{th}$ resource pool.

In another possible implementation, the parameter includes at least two of a starting frequency domain unit (for example, a starting RB), a quantity of frequency domain units (for example, a quantity of RBs), and an ending frequency domain unit (for example, an ending RB) of an $i^{th}$ resource pool.

By way of example, and not limitation, a frequency domain resource in a resource pool may be a starting RB to an RB whose index is obtained by adding a quantity of RBs to an index of the starting RB, and/or an RB whose index is obtained by subtracting a quantity of RBs from an index of an ending RB to the ending RB, and/or a starting RB to an ending RB.

In this embodiment of this application, because a frequency domain resource of a resource pool is described in this embodiment of this application, the terminal device further needs to consider a subcarrier spacing when configuring the resource pool, so that another parameter (for example, a second parameter) used to configure the resource pool needs to correspond to the subcarrier spacing. This embodiment may be used as an independent embodiment, or may be combined with another embodiment of the present invention. This is not limited in this application.

Optionally, if the first parameter includes the subcarrier spacing, the terminal device may determine the M resource pools in the SL BWP based on the subcarrier spacing in the first parameter.

In other words, a remaining parameter (for example, the second parameter) that is obtained by the terminal device based on the subcarrier spacing in the first parameter and that is used to configure the resource pools is a parameter corresponding to the subcarrier spacing. For example, if the subcarrier spacing in the first parameter is 15 kHz, and a subchannel bandwidth size corresponding to the subcarrier spacing is two frequency domain units, a subchannel bandwidth size in the second parameter obtained by the terminal device is the two frequency domain units corresponding to the subcarrier spacing.

During implementation, the terminal device obtains the first parameter in the SL BWP configuration information. If the terminal device receives the second parameter sent by the network device, the terminal device considers by default that the second parameter is the parameter corresponding to the subcarrier spacing; or if the terminal device determines the second parameter, the terminal device directly determines the second parameter based on the subcarrier spacing.

By way of example, and not limitation, the second parameter may alternatively be a parameter corresponding to a subcarrier spacing (denoted as a subcarrier spacing 1 for ease of differentiation and understanding) specified in a protocol, and the subcarrier spacing 1 may be the same as or different from the subcarrier spacing (denoted as a subcarrier spacing 2 for ease of differentiation and understanding) of the resource pool. If the subcarrier spacing 1 is different from the subcarrier spacing 2, the second parameter corresponding to the subcarrier spacing 1 needs to be converted into a second parameter corresponding to the subcarrier spacing 2. For example, if the subcarrier spacing 1 is 15 kHz, a subchannel bandwidth size corresponding to the subcarrier spacing 1 in the second parameter is four frequency domain units, and the subcarrier spacing 2 is 30 kHz, it may be learned, based on an indication of the second parameter, that a subchannel bandwidth size corresponding to the subcarrier spacing 2 is two frequency domain units. In this case, the terminal device needs to convert the subchannel bandwidth size from four frequency domain units indicated in the second parameter into two frequency domain units.

In this embodiment of this application, when the network device sends the second parameter to the terminal device by using signaling, there may be different indication forms based on different reference positions relative to the starting frequency domain unit of the first subchannel. The following describes related content of a reference position relative to the starting frequency domain unit of the first subchannel. This embodiment may be used as an independent embodiment, or may be combined with another embodiment of the present invention. This is not limited in this application. One or more of the following manners may be used.

Manner A1

The starting frequency domain unit of the first subchannel is offset by $K_1$ frequency domain units from the starting frequency domain unit of the SL BWP, where $K_1$ is an integer greater than or equal to 0.

In other words, the reference position of the starting frequency domain unit of the first subchannel is the starting frequency domain unit of the SL BWP.

In this case, an index of the starting frequency domain unit of the first subchannel is determined based on a quantity of frequency domain units by which the starting frequency domain unit of the first subchannel is offset from the starting frequency domain unit of the SL BWP.

As described above, the index may be an index of a frequency domain unit in the SL BWP, and is designed by using the SL BWP as a reference object. Before indicating the starting frequency domain unit of the first subchannel by using the index, the network device may renumber the frequency domain units in the SL BWP, to generate indexes in the SL BWP. In this way, the index of the starting frequency domain unit of the first subchannel is related to the quantity of frequency domain units by which the starting frequency domain unit of the first subchannel is offset from the starting frequency domain unit of the SL BWP.

For example, the index of the starting frequency domain unit of the first subchannel is the quantity of frequency domain units by which the starting frequency domain unit of the first subchannel is offset from the starting frequency domain unit of the SL BWP.

Figure 11:
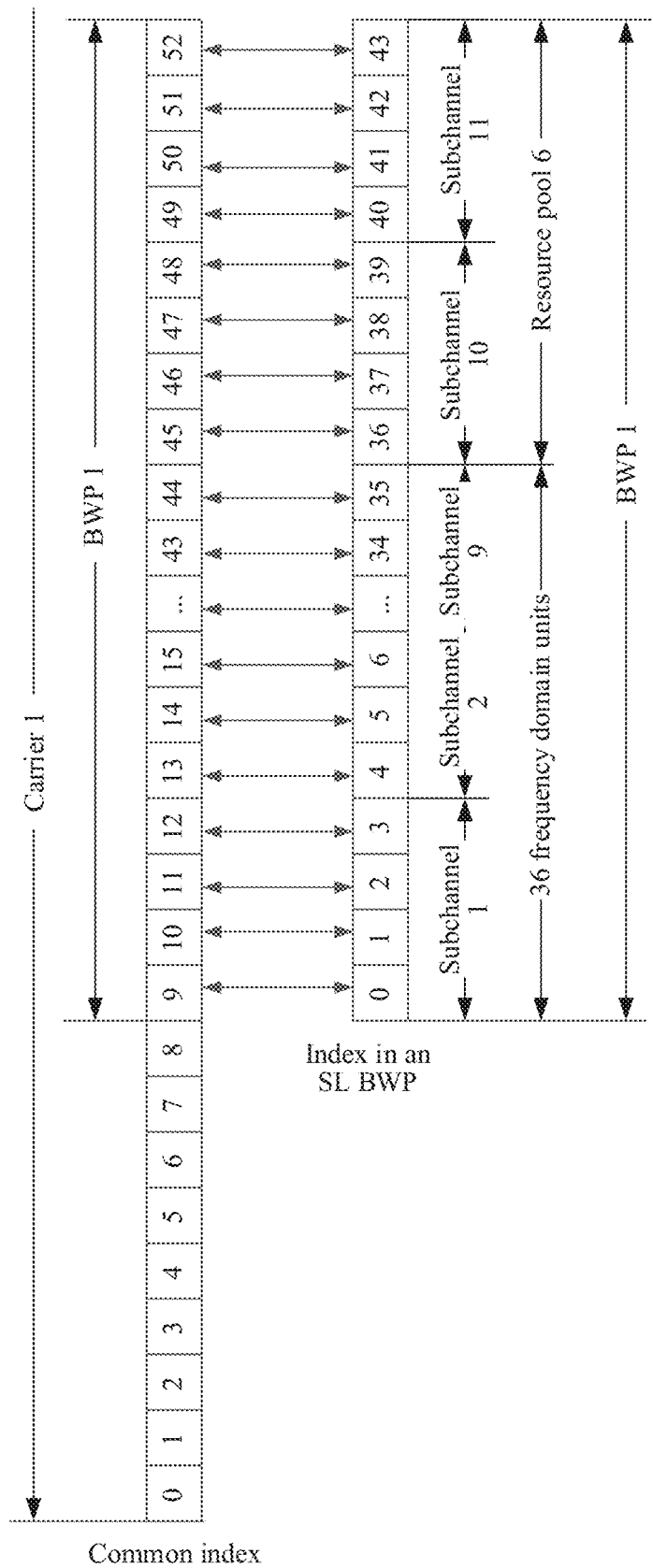
FIG. 11 is a schematic diagram of an index of a frequency domain resource, in a bandwidth part, separately located on a carrier and the bandwidth part according to an embodiment of this application.

As shown in FIG. 11, the network device may renumber the indexes of the frequency domain units in the SL BWP, so that the indexes of the frequency domain units in the SL BWP are 0 to 43. Using a resource pool 6 as an example, an index of a starting frequency domain unit of the first subchannel in the resource pool 6 is 36, that is, the starting frequency domain unit of the first subchannel is offset by 36 frequency domain units from the starting frequency domain unit of the SL BWP.

It can be learned that, after the frequency domain units of the SL BWP are renumbered, because a newly generated index of a frequency domain unit has a relatively small value, a relatively small quantity of bits are occupied. Therefore, when a newly generated index is used to indicate a frequency domain unit, occupied bits can be effectively reduced, thereby saving resources.

By way of example, and not limitation, the network device may alternatively indicate the starting frequency domain unit of the first subchannel by indicating $K_1$. In this case, the terminal device only needs to determine that the reference position of the starting frequency domain unit of the first subchannel is the starting frequency domain unit of the SL BWP, and may not need to renumber the frequency domain units in the SL BWP.

Manner B1

The starting frequency domain unit of the first subchannel is offset by $K_2$ frequency domain units from a starting frequency domain unit of a first carrier, where the first carrier is a carrier to which the frequency domain resource of the it h resource pool belongs, and $K_2$ is an integer greater than or equal to 0.

In other words, the reference position of the starting frequency domain unit of the first subchannel is the starting frequency domain unit of the first carrier.

In this case, an index of the starting frequency domain unit of the first subchannel is determined based on a quantity of frequency domain units by which the starting frequency domain unit of the first subchannel is offset from the starting frequency domain unit of the first carrier.

As described above, the index may be a common index of a frequency domain unit, and is designed by using the first carrier as a reference object. The network device may indicate the starting frequency domain unit of the first subchannel by using an existing common index in the system.

For example, the index of the starting frequency domain unit of the first subchannel is the quantity of frequency domain units by which the starting frequency domain unit of the first subchannel is offset from the starting frequency domain unit of the first carrier.

Figure 12:
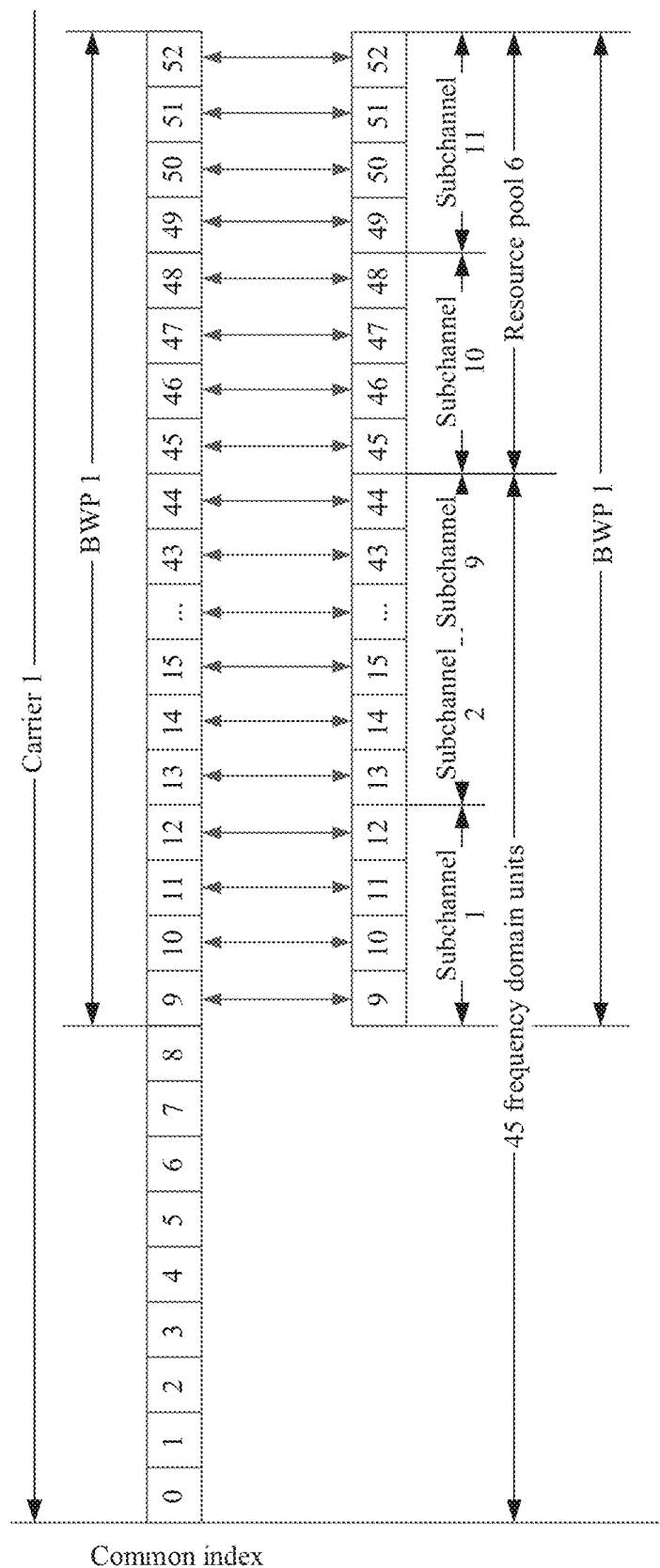
FIG. 12 is another schematic diagram of an index of a frequency domain resource, in a bandwidth part, separately located on a carrier and the bandwidth part according to an embodiment of this application.

As shown in FIG. 12, common indexes of the frequency domain units in the SL BWP are 9 to 52. Using a resource pool 6 as an example, an index of a starting frequency domain unit of the first subchannel in the resource pool 6 is 45, that is, the starting frequency domain unit of the first subchannel is offset by 45 frequency domain units from a starting frequency domain unit of a carrier 1.

By way of example, and not limitation, the network device may alternatively indicate the starting frequency domain unit of the first subchannel by indicating $K_2$.

The foregoing describes the indication manner of the reference position of the starting frequency domain unit of the first subchannel and the associated starting frequency domain unit of the first subchannel. It should be understood that the terminal device and the network device agree upon a manner used to indicate the frequency domain units. If Manner A is used, the terminal device may also renumber the frequency domain units in the SL BWP, to generate the indexes of the frequency domain units in the SL BWP. In this way, after receiving an index used to indicate a frequency domain unit of the first subchannel, the terminal device can accurately determine the frequency domain unit indicated by the index. If Manner B is used, the terminal device may not need to renumber the frequency domain units in the SL BWP, but may directly determine, by using a common index of a frequency domain unit, the frequency domain unit indicated by the index.

The foregoing describes a manner in which the network device indicates the starting frequency domain unit of the first subchannel in the resource pool. In some implementations (for example, Manner 4), the network device may send a related parameter of each resource pool to the terminal device, so that the terminal device determines a position of each resource pool. The related parameter of each resource pool may include a starting frequency domain unit of the resource pool. In this manner, a manner in which the network device indicates a starting frequency domain unit of a resource pool may be similar to the foregoing manner in which the network device indicates the starting frequency domain unit of the first subchannel in the resource pool. The following describes related content of a reference position relative to the starting frequency domain unit of the resource pool. This embodiment may be used as an independent embodiment, or may be combined with another embodiment of the present invention. This is not limited in this application. During implementation, any one of the following manners may be used.

Manner A2

The starting frequency domain unit of the resource pool is offset by $K_3$ frequency domain units from the starting frequency domain unit of the SL BWP, where $K_3$ is an integer greater than or equal to 0.

In other words, a reference position of the starting frequency domain unit of the resource pool is the starting frequency domain unit of the SL BWP.

In this case, an index of the starting frequency domain unit of the resource pool is determined based on a quantity of frequency domain units by which the starting frequency domain unit of the resource pool is offset from the starting frequency domain unit of the SL BWP.

As described above, the index may be an index of a frequency domain unit in the SL BWP, and is designed by using the SL BWP as a reference object. Before indicating the starting frequency domain unit of the resource pool by using the index, the network device may renumber the frequency domain units in the SL BWP, to generate indexes in the SL BWP. In this way, the index of the starting frequency domain unit of the resource pool is related to the quantity of frequency domain units by which the starting frequency domain unit of the resource pool is offset from the starting frequency domain unit of the SL BWP.

For example, the index of the starting frequency domain unit of the resource pool is the quantity of frequency domain units by which the starting frequency domain unit of the resource pool is offset from the starting frequency domain unit of the SL BWP.

As shown in FIG. 11, the network device may renumber the indexes of the frequency domain units in the SL BWP, so that the indexes of the frequency domain units in the SL BWP are 0 to 43. Using a resource pool 6 as an example, an index of a starting frequency domain unit of the resource pool 6 is 36, that is, the starting frequency domain unit is offset by 36 frequency domain units from the starting frequency domain unit of the SL BWP.

It can be learned that, after the frequency domain units of the SL BWP are renumbered, because a newly generated index of a frequency domain unit has a relatively small value, a relatively small quantity of bits are occupied. Therefore, when a newly generated index is used to indicate a frequency domain unit, occupied bits can be effectively reduced, thereby saving resources.

By way of example, and not limitation, the network device may alternatively indicate the starting frequency domain unit of the resource pool by indicating $K_3$. In this case, the terminal device only needs to determine that the reference position of the starting frequency domain unit of the resource pool is the starting frequency domain unit of the SL BWP, and may not need to renumber the frequency domain units in the SL BWP.

Manner B2

The starting frequency domain unit of the resource pool is offset by $K_4$ frequency domain units from a starting frequency domain unit of a first carrier, where the first carrier is a carrier to which the frequency domain resource of the $i^{th}$ resource pool belongs, and $K_4$ is an integer greater than or equal to 0.

In other words, a reference position of the starting frequency domain unit of the resource pool is the starting frequency domain unit of the first carrier.

In this case, an index of the starting frequency domain unit of the resource pool is determined based on a quantity of frequency domain units by which the starting frequency domain unit of the resource pool is offset from the starting frequency domain unit of the first carrier.

As described above, the index may be a common index of a frequency domain unit, and is designed by using the first carrier as a reference object. The network device may indicate the starting frequency domain unit of the resource pool by using an existing common index in the system.

For example, the index of the starting frequency domain unit of the resource pool is the quantity of frequency domain units by which the starting frequency domain unit of the resource pool is offset from the starting frequency domain unit of the first carrier.

As shown in FIG. 12, common indexes of the frequency domain units in the SL BWP are 9 to 52. Using a resource pool 6 as an example, an index of a starting frequency domain unit of the resource pool 6 is 45, that is, the starting frequency domain unit is offset by 45 frequency domain units from a starting frequency domain unit of a carrier 1.

By way of example, and not limitation, the network device may alternatively indicate the starting frequency domain unit of the resource pool by indicating $K_4$.

The foregoing describes the indication manner of the reference position of the starting frequency domain unit of the resource pool and the associated starting frequency domain unit of the resource pool. It should be understood that the terminal device and the network device agree upon a manner used to indicate the frequency domain units. If Manner A is used, the terminal device may also renumber the frequency domain units in the SL BWP, to generate the indexes of the frequency domain units in the SL BWP. In this way, after receiving an index used to indicate a frequency domain unit of the resource pool, the terminal device can accurately determine the frequency domain unit indicated by the index. If Manner B is used, the terminal device may not need to renumber the frequency domain units in the SL BWP, but may directly determine, by using a common index of a frequency domain unit, the frequency domain unit indicated by the index.

It should be understood that, for an indication manner of the ending frequency domain unit in this application, a manner similar to the indication manner of the starting frequency domain unit may also be used. Details are not described again in this application.

This embodiment of this application describes a resource pool configuration method. When a terminal device communicates with another terminal device, a terminal device (denoted as a first terminal device for ease of differentiation and understanding) serving as a receive end needs to know a resource pool that is used by a terminal device (denoted as a second terminal device for ease of differentiation and understanding) serving as a transmit end to send data, and the second terminal device also needs to know a resource pool in which data can be sent. This embodiment may be used as an independent embodiment, or may be combined with another embodiment of the present invention. This is not limited in this application.

In a manner, the network device may send, to the second terminal device, first indication information used to indicate a resource pool, where the first indication information may be carried in downlink control information (DCI). In another manner, the second terminal device may send, to the first terminal device, second indication information used to indicate a resource pool, where the second indication information may be carried in sidelink control information (SCI). In this embodiment of this application, the first indication information or the second indication information may be collectively referred to as index information or identification information.

Regardless of which manner is used, an index of a resource pool may be used for indication. The following describes two design manners of an index of a resource pool. During implementation, any one of the following manners may be used.

Manner C

Resource pools in the plurality of SL BWPs are independently numbered.

Figure 13:
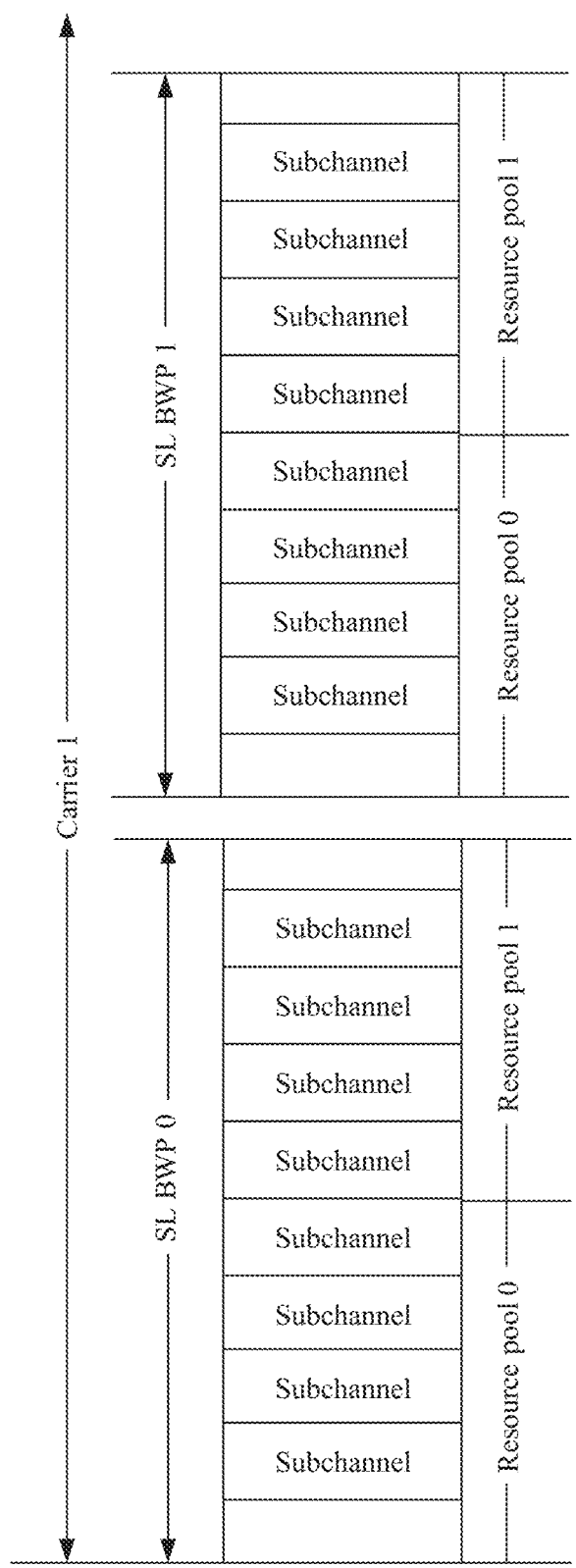
FIG. 13 is a schematic diagram of an index of a resource pool in a bandwidth part according to an embodiment of this application.

As shown in FIG. 13, two resource pools are configured in an SL BWP 0, and are respectively numbered as a resource pool 0 and a resource pool 1. Two resource pools are configured in an SL BWP 1, and are respectively numbered as a resource pool 0 and a resource pool 1.

In this manner, an index of a resource pool is an index in an SL BWP.

Optionally, to accurately indicate a resource pool, information indicated in the first indication information or the second indication information may include an index of the SL BWP and an index of the resource pool.

Manner D

Resource pools in the plurality of SL BWPs are jointly numbered.

Figure 14:
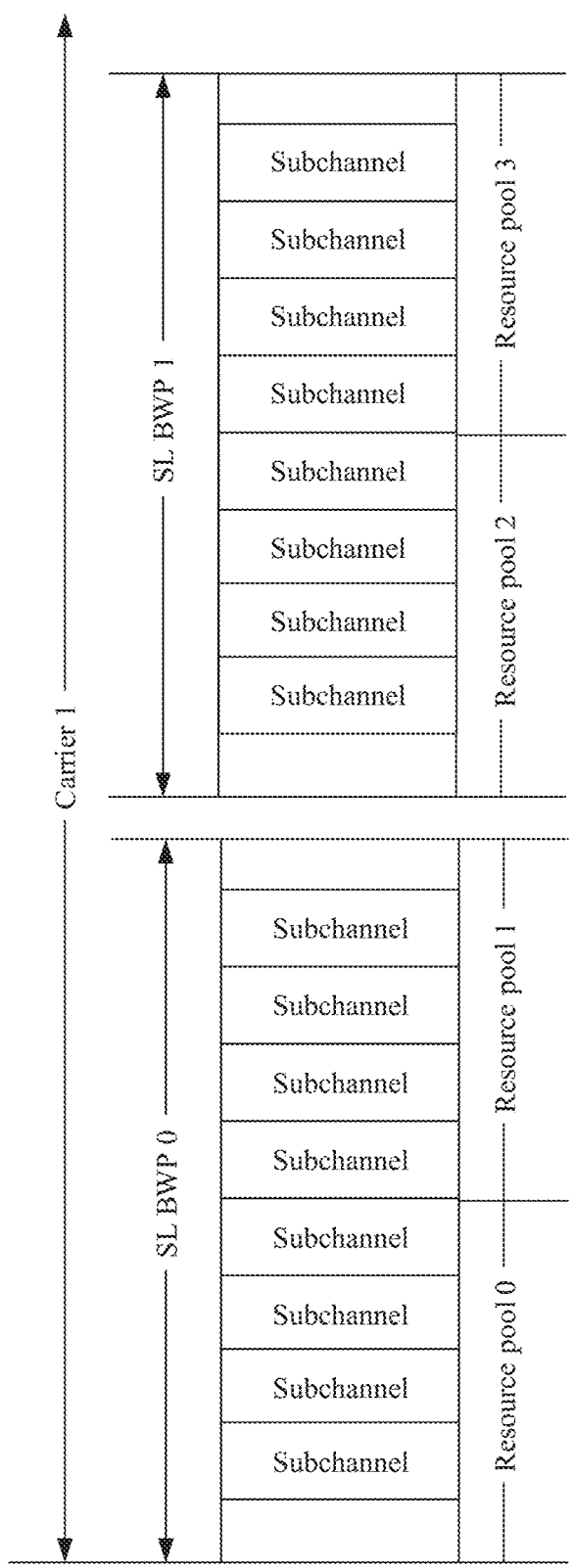
FIG. 14 is another schematic diagram of an index of a resource pool in a bandwidth part according to an embodiment of this application.

As shown in FIG. 14, two resource pools are configured in an SL BWP 0, and are respectively numbered as a resource pool 0 and a resource pool 1. Two resource pools are configured in an SL BWP 1, and are respectively numbered as a resource pool 2 and a resource pool 3.

In this manner, an index of a resource pool is an index in a carrier.

Optionally, information indicated in the first indication information or the second indication information may include only an index of a resource pool.

Whether Manner 1 or Manner 2 is specifically used may be predefined in a protocol, or may be notified by the network device to the terminal device by using signaling. Specifically, this is not limited in this application.

It should be noted that the terminal device in this embodiment of this application may be either of the first terminal device or the second terminal device.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the sidelink resource configuration methods according to the embodiments of this application with reference to FIG. 1 to FIG. 14. The following describes in detail sidelink resource configuration apparatuses according to the embodiments of this application with reference to FIG. 15 to FIG. 17.

Figure 15:
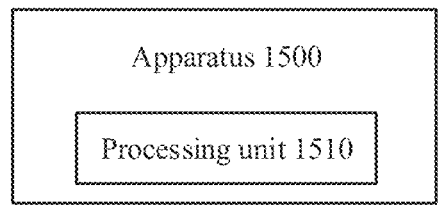
FIG. 15 is a schematic diagram of a sidelink resource configuration apparatus according to an embodiment of this application.

FIG. 15 shows a sidelink resource configuration apparatus 1500 according to an embodiment of this application. The apparatus 1500 may be a terminal device, or may be a chip in a terminal device. The apparatus 1500 includes a processing unit 1510 and a processing unit 1520.

The processing unit 1510 is configured to obtain a first parameter, where the first parameter is a common parameter of M resource pools in the SL BWP, frequency domain resources in the M resource pools are located in the SL BWP, and M is an integer greater than or equal to 1.

The processing unit 1520 is configured to configure the M resource pools, where at least one same parameter is configured for the M resource pools, and the at least one parameter is determined based on the first parameter.

Therefore, according to the sidelink resource configuration apparatus in this embodiment of this application, the apparatus may configure, in the SL BWP, a resource pool used by the terminal device to perform sidelink communication, and obtain the common first parameter of the resource pools in the SL BWP by using SL BWP configuration information, so that the at least one parameter determined based on the first parameter is applicable to all the resource pools in the SL BWP. In other words, the resource pools configured in the SL BWP have the at least one same parameter. In this way, communication between different terminal devices can be implemented by configuring the resource pools in the SL BWP.

In addition, in this embodiment of this application, signaling of a resource pool may not need to be configured for each resource pool. Instead, the SL BWP configuration information used to indicate the common first parameter of the resource pools in the SL BWP is configured. In other words, the first parameter may be designed for all the resource pools in the SL BWP. This conforms to a concept of a BWP, and a design is simple. Signaling overheads can be effectively reduced especially when the SL BWP includes a plurality of resource pools.

The apparatus further includes: a receiving unit 1520, where the receiving unit 1520 is configured to receive SL BWP configuration information, and the SL BWP configuration information is used to indicate the first parameter.

Optionally, the first parameter includes at least one of the following: a waveform, an uplink/downlink configuration of a frame structure, or a parameter set, and the parameter set includes a subcarrier spacing and/or a cyclic prefix CP.

Optionally, the processing unit 1520 is specifically configured to determine frequency domain positions of the M resource pools based on an SL BWP bandwidth size and a starting frequency domain unit of the SL BWP.

Optionally, an $i^{th}$ resource pool in the M resource pools includes N subchannels, where N is an integer greater than or equal to 1, and $i \in [1,M]$; and the processing unit 1520 is specifically configured to configure a frequency domain position of the $i^{th}$ resource pool based on a second parameter, where the second parameter includes: at least one of a subchannel bandwidth size or the quantity N of subchannels included in the $i^{th}$ resource pool, and a starting frequency domain unit of the first subchannel in the N subchannels, where the first subchannel occupies a lowest or highest frequency domain position in the N subchannels.

Optionally, the $i^{th}$ resource pool is the first resource pool in the M resource pools, a starting frequency domain unit of the first subchannel in the first resource pool is a starting frequency domain unit of the SL BWP, and the first resource pool occupies a lowest or highest frequency domain position in the M resource pools.

Optionally, if the second parameter includes the subchannel bandwidth size, the subchannel bandwidth size is determined based on a mapping relationship between the SL BWP bandwidth size and the subchannel bandwidth size.

Optionally, the starting frequency domain unit of the first subchannel is offset by $K_1$ frequency domain units from the starting frequency domain unit of the SL BWP, where $K_1$ is an integer greater than or equal to 0.

Optionally, an index of the starting frequency domain unit of the first subchannel is a quantity of frequency domain units by which the starting frequency domain unit of the first subchannel is offset from the starting frequency domain unit of the SL BWP.

Optionally, the first parameter includes the subcarrier spacing; and the processing unit 1520 is specifically configured to configure the M resource pools based on the subcarrier spacing.

It should be understood that the apparatus 1500 herein is embodied in a form of functional units. The term "unit" herein may be an application-specific integrated circuit (application specific integrated circuit, ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that, the apparatus 1500 may be specifically the terminal device in the foregoing embodiments; and the apparatus 1500 may be configured to perform procedures and/or steps corresponding to the terminal device in the foregoing method embodiments. To avoid repetition, details are not described herein.

Figure 16:
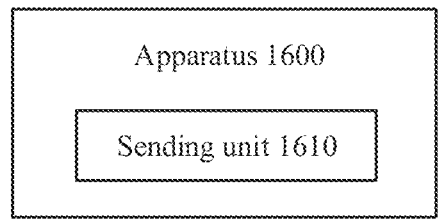
FIG. 16 is a schematic diagram of another sidelink resource configuration apparatus according to an embodiment of this application.

FIG. 16 shows another sidelink resource configuration apparatus 1600 according to an embodiment of this application. The apparatus 1600 may be a network device, or may be a chip in a network device. The apparatus 1600 includes a sending unit 1610.

The sending unit 1610 is configured to send sidelink bandwidth part SL BWP configuration information, where the SL BWP configuration information includes a first parameter, the first parameter is a common parameter used to configure M resource pools in the SL BWP, frequency domain resources in the M resource pools are located in the SL BWP, and M is an integer greater than or equal to 1.

Therefore, according to the sidelink resource configuration apparatus in this embodiment of this application, the apparatus sends, to the terminal device, the SL BWP configuration information that includes the common first parameter of the resource pools, so that when the terminal device configures the resource pools in the SL BWP, at least one parameter determined based on the first parameter is applicable to all the resource pools in the SL BWP. In other words, the resource pools configured in the SL BWP have the at least one same parameter. In this way, the terminal device can configure the resource pools in the SL BWP, so that communication between different terminal devices can be implemented.

In addition, in this embodiment of this application, signaling of a resource pool may not need to be configured for each resource pool. Instead, the SL BWP configuration information used to indicate the common first parameter of the resource pools in the SL BWP is configured. When the SL BWP includes a plurality of resource pools, signaling overheads can be effectively reduced.

Optionally, the first parameter includes at least one of the following: a waveform, an uplink/downlink configuration of a frame structure, or a parameter set, and the parameter set includes a subcarrier spacing and/or a cyclic prefix CP.

Optionally, an $i^{th}$ resource pool in the M resource pools includes N subchannels, where N is an integer greater than or equal to 1, and $i \in [1,M]$; and the sending unit 1610 is further configured to send indication information used to indicate a second parameter, where the second parameter includes: at least one of a subchannel bandwidth size and the quantity N of subchannels included in the $i^{th}$ resource pool, and a starting frequency domain unit of the first subchannel in the N subchannels, where the first subchannel occupies a lowest or highest frequency domain position in the N subchannels.

Optionally, the $i^{th}$ resource pool is the first resource pool in the M resource pools, a starting frequency domain unit of the first subchannel in the first resource pool is a starting frequency domain unit of the SL BWP, and the first resource pool occupies a lowest or highest frequency domain position in the M resource pools.

Optionally, if the second parameter includes the subchannel bandwidth size, the subchannel bandwidth size is determined based on a mapping relationship between an SL BWP bandwidth size and the subchannel bandwidth size.

Optionally, the starting frequency domain unit of the first subchannel is offset by $K_1$ frequency domain units from the starting frequency domain unit of the SL BWP, where $K_1$ is an integer greater than or equal to 0.

Optionally, an index of the starting frequency domain unit of the first subchannel is a quantity of frequency domain units by which the starting frequency domain unit of the first subchannel is offset from the starting frequency domain unit of the SL BWP.

It should be understood that the apparatus 1600 herein is embodied in a form of functional units. The term "unit" herein may be an application-specific integrated circuit (application specific integrated circuit, ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that, the apparatus 1600 may be specifically the network device in the foregoing embodiments; and the apparatus 1600 may be configured to perform procedures and/or steps corresponding to the network device in the foregoing method embodiments. To avoid repetition, details are not described herein again.

The apparatus 1500 and the apparatus 1600 in the foregoing solutions have functions of implementing corresponding steps performed by the terminal device or the network device in the foregoing methods. The functions may be implemented by hardware, or may be implemented by hardware executing corresponding software. The hardware or the software includes one or more modules corresponding to the foregoing functions. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In the embodiments of this application, the apparatuses in FIG. 15 and FIG. 16 may alternatively be chips or chip systems, for example, systems on chip (SoC). Correspondingly, the receiving unit and the sending unit may be a transceiver circuit of the chip. This is not limited herein.

Figure 17:
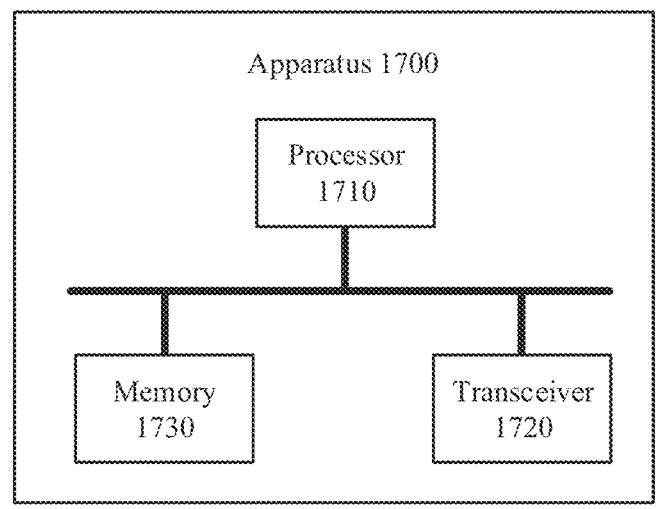
FIG. 17 is a schematic diagram of still another sidelink resource configuration apparatus according to an embodiment of this application.

FIG. 17 shows another sidelink resource configuration apparatus 1700 according to an embodiment of this application. The apparatus 1700 includes a processor 1710, a transceiver 1720, and a memory 1730. The processor 1710, the transceiver 1720, and the memory 1730 communicate with each other by using an internal connection path. The memory 1730 is configured to store an instruction. The processor 1710 is configured to execute the instruction stored in the memory 1730, to control the transceiver 1720 to send a signal and/or receive a signal.

In a possible implementation, the apparatus 1700 is configured to perform procedures and steps corresponding to the terminal device in the foregoing method embodiments.

The processor 1710 is configured to: obtain a first parameter, where the first parameter is a common parameter of M resource pools in the SL BWP, frequency domain resources in the M resource pools are located in the SL BWP, and M is an integer greater than or equal to 1; and configure the M resource pools, where at least one same parameter is configured for the M resource pools, and the at least one parameter is determined based on the first parameter.

In another possible implementation, the apparatus 1700 is configured to perform procedures and steps corresponding to the terminal device in the foregoing method 200.

In another possible implementation, the apparatus 1700 is configured to perform procedures and steps corresponding to the network device in the foregoing method embodiments.

The transceiver 1720 is configured to send sidelink bandwidth part SL BWP configuration information, where the SL BWP configuration information includes a first parameter, the first parameter is a common parameter used to configure M resource pools in the SL BWP, frequency domain resources in the M resource pools are located in the SL BWP, and M is an integer greater than or equal to 1.

It should be understood that, the apparatus 1700 may be specifically the terminal device or the network device in the foregoing embodiments, and may be configured to perform steps and/or procedures corresponding to the terminal device or the network device in the foregoing method embodiments. Optionally, the memory 1730 may include a read-only memory and a random access memory, and provide an instruction and data for the processor. A part of the memory may further include a non-volatile random access memory. For example, the memory may further store information about a device type. The processor 1710 may be configured to execute the instruction stored in the memory. In addition, when the processor 1710 executes the instruction stored in the memory, the processor 1710 is configured to perform steps and/or procedures corresponding to the terminal device or the network device in the foregoing method embodiments.

It should be understood that, in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, the steps in the foregoing methods may be completed by using a hardware integrated logic circuit in the processor or an instruction in a form of software. The steps in the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps in the foregoing methods in combination with the hardware of the processor. To avoid repetition, details are not described herein again.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may indicate a, b, c, a and b, a and c, b and c, or a, b, and c, where a, b, and c may be singular or plural.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps in the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   obtaining, by a terminal device, a first parameter, wherein the first parameter is a common parameter of M resource pools in a sidelink bandwidth part (SL BWP), frequency domain resources in the M resource pools are located in the SL BWP, and M is an integer greater than or equal to 1; and
   configuring, by the terminal device based on the first parameter, the M resource pools for sidelink communications, with at least one same parameter configured for the M resource pools, wherein the at least one same parameter is determined based on the first parameter.

2. The method according to claim 1, wherein obtaining, by the terminal device, the first parameter comprises:
   receiving, by the terminal device, SL BWP configuration information, wherein the SL BWP configuration information indicates the first parameter.

3. The method according to claim 1, wherein the first parameter comprises at least one of following: a waveform, an uplink/downlink configuration of a frame structure, or a parameter set, and the parameter set comprises a subcarrier spacing and/or a cyclic prefix (CP).

4. The method according to claim 1, wherein configuring, by the terminal device, the M resource pools comprises:
   determining, by the terminal device, frequency domain positions of the M resource pools based on an SL BWP bandwidth size and a starting frequency domain unit of the SL BWP.

5. The method according to claim 1, wherein an $i^{th}$ resource pool in the M resource pools comprises N subchannels, N is an integer greater than or equal to 1, and $i \in [1,M]$; and
   wherein configuring, by the terminal device, the M resource pools comprises:
   configuring, by the terminal device, a frequency domain position of the $i^{th}$ resource pool based on a second parameter, wherein the second parameter comprises:
   at least one of a subchannel bandwidth size or N, and a starting frequency domain unit of a first subchannel in the N subchannels, wherein the first subchannel occupies a lowest or highest frequency domain position in the N subchannels.

6. A method comprising:
   sending, by a network device, sidelink bandwidth part (SL BWP) configuration information, wherein the SL BWP configuration information indicates a first parameter, the first parameter is a common parameter used to configure M resource pools in the SL BWP for sidelink communications, frequency domain resources in the M resource pools are located in the SL BWP, and M is an integer greater than or equal to 1.

7. The method according to claim 6, wherein the first parameter comprises at least one of following: a waveform, an uplink/downlink configuration of a frame structure, or a parameter set, and the parameter set comprises a subcarrier spacing and/or a cyclic prefix (CP).

8. The method according to claim 6, wherein an $i^{th}$ resource pool in the M resource pools comprises N subchannels, N is an integer greater than or equal to 1, and $i \in [1,M]$; and
wherein the method further comprises:
sending, by the network device, indication information indicating a second parameter, wherein the second parameter comprises:
at least one of a subchannel bandwidth size or N, and a starting frequency domain unit of a first subchannel in the N subchannels, wherein the first subchannel occupies a lowest or highest frequency domain position in the N subchannels.

9. The method according to claim 8, wherein the $i^{th}$ resource pool is a first resource pool in the M resource pools, a starting frequency domain unit of the first subchannel in the first resource pool is a starting frequency domain unit of the SL BWP, and the first resource pool occupies a lowest or highest frequency domain position in the M resource pools.

10. The method according to claim 8, wherein the second parameter comprises the subchannel bandwidth size, and the subchannel bandwidth size is determined based on a mapping relationship between an SL BWP bandwidth size and the subchannel bandwidth size.

11. An apparatus comprising:
a non-transitory memory storage comprising instructions; and
one or more processors in communication with the memory storage, wherein the instructions, when executed by the one or more processors, cause the apparatus to:
obtain a first parameter, wherein the first parameter is a common parameter of M resource pools in a sidelink bandwidth part (SL BWP), frequency domain resources in the M resource pools are located in the SL BWP, and M is an integer greater than or equal to 1; and
configure, based on the first parameter, the M resource pools for sidelink communications, with at least one same parameter configured for the M resource pools, wherein the at least one same parameter is determined based on the first parameter.

12. The apparatus according to claim 11, wherein the instructions, when executed by the one or more processors, cause the apparatus further to:
receive, with a receiver, SL BWP configuration information, wherein the SL BWP configuration information indicates the first parameter.

13. The apparatus according to claim 11, wherein the first parameter comprises at least one of following: a waveform, an uplink/downlink configuration of a frame structure, or a parameter set, and the parameter set comprises a subcarrier spacing and/or a cyclic prefix (CP).

14. The apparatus according to claim 11, wherein the instructions, when executed by the one or more processors, cause the apparatus further to:
determine frequency domain positions of the M resource pools based on an SL BWP bandwidth size and a starting frequency domain unit of the SL BWP.

15. The apparatus according to claim 11, wherein an $i^{th}$ resource pool in the M resource pools comprises N subchannels, N is an integer greater than or equal to 1, and $i \in [1,M]$; and
wherein the instructions, when executed by the one or more processors, cause the apparatus further to:
configure a frequency domain position of the $i^{th}$ resource pool based on a second parameter, wherein the second parameter comprises:
at least one of a subchannel bandwidth size or N, and a starting frequency domain unit of a first subchannel in the N subchannels, wherein the first subchannel occupies a lowest or highest frequency domain position in the N subchannels.

16. An apparatus comprising:
a non-transitory memory storage comprising instructions; and
one or more processors in communication with the memory storage, wherein the instructions, when executed by the one or more processors, cause the apparatus to:
send sidelink bandwidth part (SL BWP) configuration information, wherein the SL BWP configuration information comprises a first parameter, the first parameter is a common parameter used to configure M resource pools in the SL BWP for sidelink communications, frequency domain resources in the M resource pools are located in the SL BWP, and M is an integer greater than or equal to 1.

17. The apparatus according to claim 16, wherein the first parameter comprises at least one of following: a waveform, an uplink/downlink configuration of a frame structure, or a parameter set, and the parameter set comprises a subcarrier spacing and/or a cyclic prefix (CP).

18. The apparatus according to claim 16, wherein an $i^{th}$ resource pool in the M resource pools comprises N subchannels, N is an integer greater than or equal to 1, and $i \in [1,M]$; and
wherein the instructions, when executed by the one or more processors, cause the apparatus further to:
send indication information indicating a second parameter, wherein the second parameter comprises:
at least one of a subchannel bandwidth size or N, and a starting frequency domain unit of a first subchannel in the N subchannels, wherein the first subchannel occupies a lowest or highest frequency domain position in the N subchannels.

19. The apparatus according to claim 18, wherein the $i^{th}$ resource pool is a first resource pool in the M resource pools, a starting frequency domain unit of the first subchannel in the first resource pool is a starting frequency domain unit of the SL BWP, and the first resource pool occupies a lowest or highest frequency domain position in the M resource pools.

20. The apparatus according to claim 18, wherein the second parameter comprises the subchannel bandwidth size, and the subchannel bandwidth size is determined based on a mapping relationship between an SL BWP bandwidth size and the subchannel bandwidth size.

* * * * *